(12) United States Patent
Sumida et al.

(10) Patent No.: US 10,591,021 B2
(45) Date of Patent: Mar. 17, 2020

(54) METHOD FOR PRODUCING METAL ELEMENT FOR CONTINUOUSLY VARIABLE TRANSMISSION AND METAL ELEMENT FOR CONTINUOUSLY VARIABLE TRANSMISSION

(71) Applicant: HONDA MOTOR CO., LTD., Tokyo (JP)

(72) Inventors: Soichiro Sumida, Wako (JP); Toru Yagasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 652 days.

(21) Appl. No.: 15/366,141

(22) Filed: Dec. 1, 2016

(65) Prior Publication Data

US 2017/0159752 A1 Jun. 8, 2017

(30) Foreign Application Priority Data

Dec. 2, 2015 (JP) .................................. 2015-235938
Dec. 24, 2015 (JP) .................................. 2015-251216

(51) Int. Cl.
*F16G 5/16* (2006.01)
*B21D 35/00* (2006.01)
*B21D 53/14* (2006.01)

(52) U.S. Cl.
CPC ............ *F16G 5/16* (2013.01); *B21D 35/001* (2013.01); *B21D 53/14* (2013.01)

(58) Field of Classification Search
CPC ........ B21D 22/02; B21D 22/06; B21D 28/02; B21D 28/04; B21D 28/14; B21D 28/16; B21D 53/14; B21D 35/001; B21J 5/02
See application file for complete search history.

(56) References Cited

U.S. PATENT DOCUMENTS

| 4,894,049 A * | 1/1990 | Koppelaars | ............... F16G 5/16 474/240 |
| 5,004,450 A * | 4/1991 | Ide | ........................... F16G 5/16 474/242 |

(Continued)

FOREIGN PATENT DOCUMENTS

| EP | 1 128 088 A1 | 8/2001 |
| EP | 1 461 542 A1 | 9/2004 |

(Continued)

OTHER PUBLICATIONS

Translation, JP 2006-183850A, Jul. 13, 2006.*

(Continued)

*Primary Examiner* — Edward T Tolan
(74) *Attorney, Agent, or Firm* — Westerman, Hattori, Daniels & Adrian, LLP

(57) ABSTRACT

First and second inclined faces of an inclined face extending radially inward and rearward from a rocking edge formed so as to coincide with a front edge of a saddle face of a body part of a metal element are molded by press forming a metal element material using a mold. An inclined face-corresponding part of the metal element material, which corresponds to the inclined face of the metal element, includes a first inclined face-corresponding portion inclined rearward at a first inclination angle from a rocking edge-corresponding part, and a second inclined face-corresponding portion inclined rearward at a second inclination angle, which is larger than the first inclination angle, from a radially inner end of the first inclined face-corresponding portion. The mold includes a first inclined face-molding portion inclined rearward at the first inclination angle from a rocking edge-molding portion abutting against the rocking edge-corresponding part.

4 Claims, 22 Drawing Sheets

(56) References Cited

U.S. PATENT DOCUMENTS

| | | | |
|---|---|---|---|
| 5,439,422 A * | 8/1995 | Smeets | F16G 5/16 474/242 |
| 6,334,830 B1 * | 1/2002 | Yagasaki | F16G 5/16 474/201 |
| 6,427,512 B2 | 8/2002 | Suzuki et al. | |
| 6,453,716 B2 * | 9/2002 | Suzuki | B21D 53/14 72/329 |
| 6,626,782 B1 * | 9/2003 | Ohsono | B21D 53/14 474/201 |
| 6,742,373 B2 * | 6/2004 | Wakui | B21D 53/14 72/327 |
| 9,772,005 B2 * | 9/2017 | Yagasaki | F16G 5/16 |
| 2002/0138986 A1 | 10/2002 | Wakui | |
| 2014/0352387 A1 * | 12/2014 | Kakiuchi | B21D 53/14 72/330 |
| 2016/0102732 A1 | 4/2016 | Yagasaki et al. | |

FOREIGN PATENT DOCUMENTS

| | | |
|---|---|---|
| JP | 2006-183850 A | 7/2006 |
| JP | 2006-192459 A | 7/2006 |
| JP | 4132820 B2 | 8/2008 |
| JP | 2010-137240 A | 6/2010 |
| JP | 2013-130204 A | 7/2013 |
| WO | 03/069185 A1 | 8/2003 |
| WO | 2014/196254 A1 | 12/2014 |

OTHER PUBLICATIONS

Office Action dated Aug. 9, 2017, issued in counterpart Japanese Application No. 2015-251216, with English machine translation. (6 pages).

Extended European Search Report dated May 8, 2017, issued in counterpart European Application No. 16201685.1. (7 pages).

* cited by examiner

FIG.2
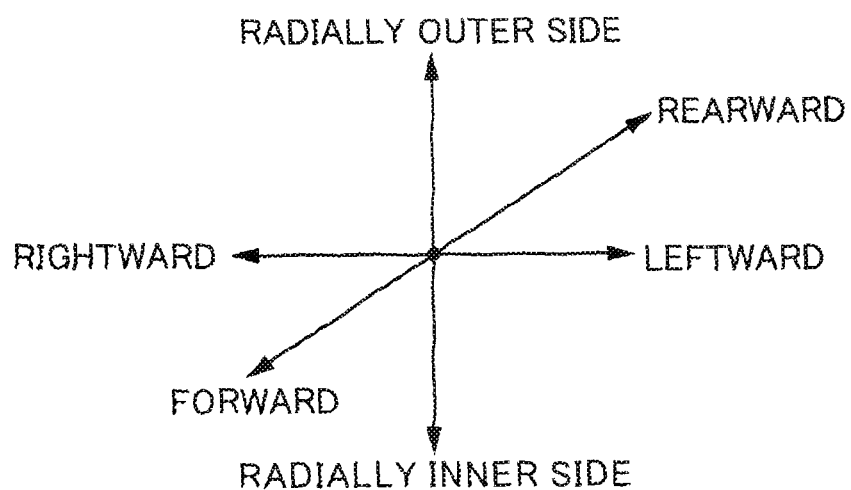
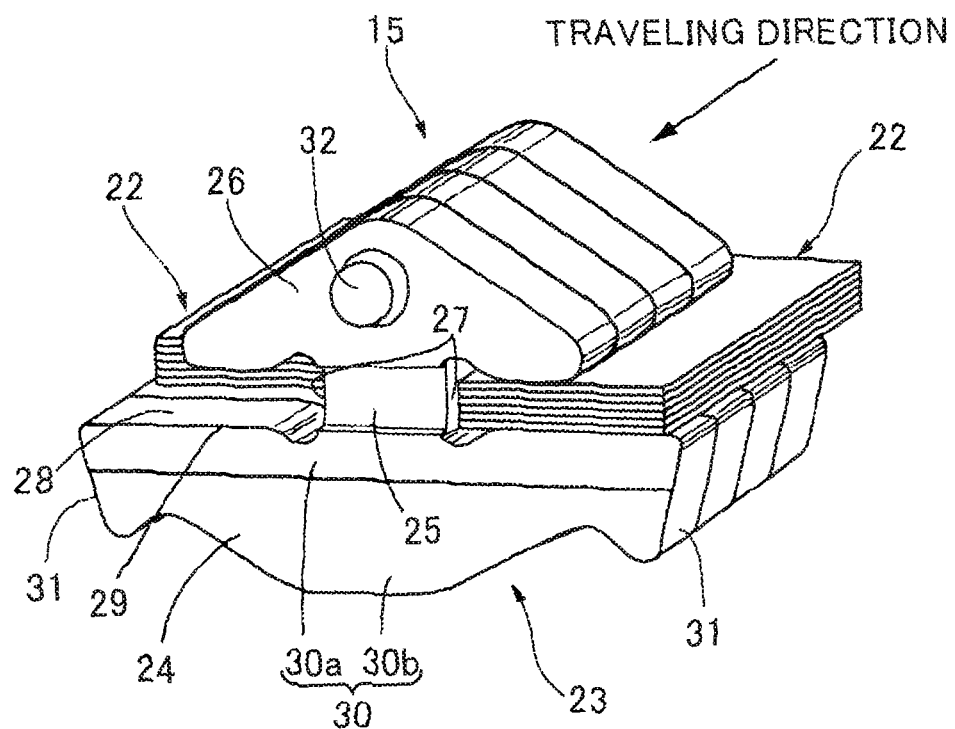

FIG.13
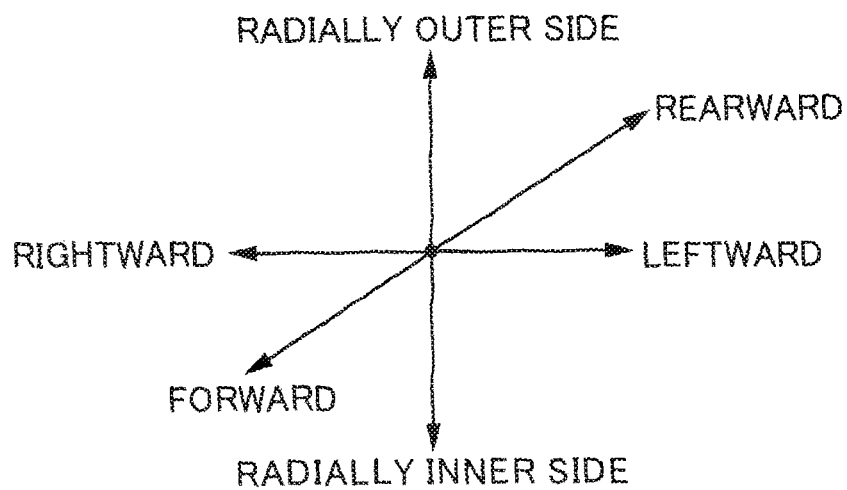
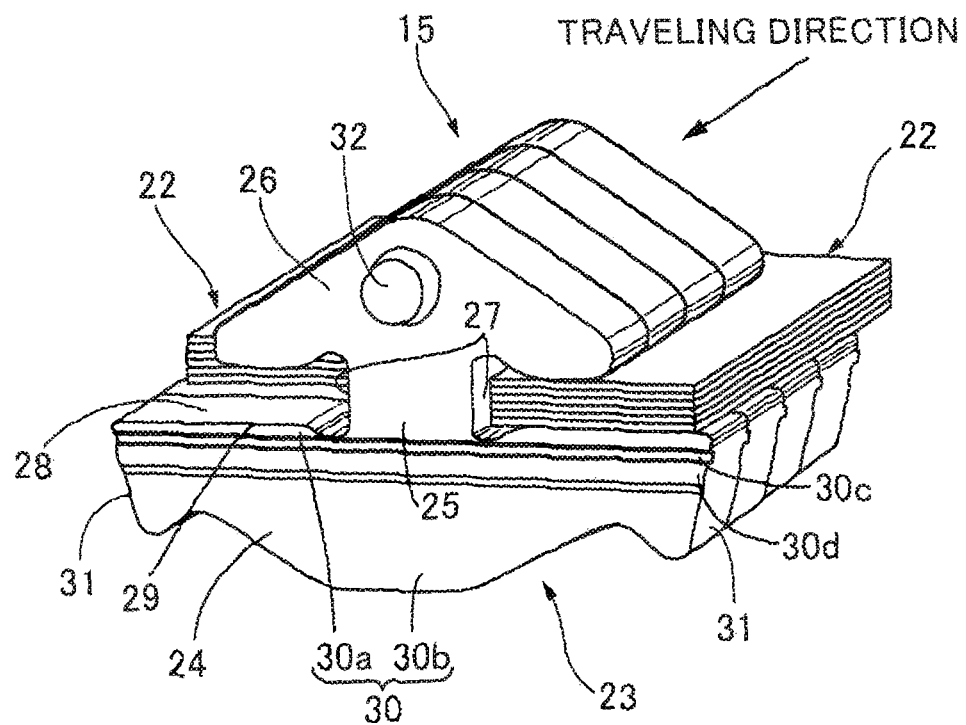

METHOD FOR PRODUCING METAL ELEMENT FOR CONTINUOUSLY VARIABLE TRANSMISSION AND METAL ELEMENT FOR CONTINUOUSLY VARIABLE TRANSMISSION

BACKGROUND OF THE INVENTION

Field of the Invention

The present invention relates to: a method for producing a metal element for a continuously variable transmission, in which the metal element is produced by, using a mold, press forming and punching out a band-shaped metal element material having a constant section; and a metal element for a continuously variable transmission produced by the method.

Description of the Related Art

With regard to a method for producing a metal element used for a metal belt of a belt type continuously variable transmission, Japanese Patent No. 4132820 has made known an arrangement in which a metal element material that is roughly molded into a shape close to a shape of the metal element product is pressed using a mold formed from a main punch and a counterpunch so as to complete molding, thus enhancing precision of a shape in a vicinity of a rocking edge of the metal element while ensuring durability of the mold.

Furthermore, International Publication No. WO2014/196254A1 has made known an arrangement in which a position of a rocking edge of a metal element used for a metal belt of a belt type continuously variable transmission is made to coincide with a front edge position of a saddle face, which is a radially outer end position of a front face of a body part of the metal element, and a positional relationship in a fore-and-aft direction of saddle faces of adjacent metal elements is thus maintained constant when the adjacent metal elements swing relative to each other with the rocking edge as a fulcrum, thereby preventing frictional loss from occurring between the saddle face and a metal ring assembly.

Moreover, when a metal element used for a metal belt of a belt type continuously variable transmission is produced by punching out a band-shaped metal plate using a mold, in order to avoid problems of a material being stretched by shear load accompanying punching out, a phenomenon (rollover) of one end part of a sheared face of a rocking edge being rounded due to plastic deformation, and it not being possible to obtain a sharp rocking edge, Japanese Patent Application Laid-open No. 2013-130204 has made known an arrangement in which a metal element having a sharp rocking edge is produced by punching out as a second element a part of the metal element that includes a rocking edge, and joining the second element to a first element forming a main body part of the metal element such that, among opposite parts of the sheared section, a sharp end part that has no rollover becomes the rocking edge.

In the arrangement described in Japanese Patent No. 4132820, as described in detail in the "DESCRIPTION OF THE PREFERRED EMBODIMENTS" section of the present specification, when a metal element is press formed using a mold, since a plate thickness of a body part positioned on a radially inner side of the metal element is slightly smaller than a plate thickness of an ear part positioned on a radially outer side, when a large number of metal elements come into intimate contact with each other in a chord portion of a metal belt when it is wound around a drive pulley and a driven pulley to transmit a driving force, the chord portion of the metal belt curves toward the radially outer side due to the difference in plate thickness, and there is a possibility that the efficiency of transmission of the driving force will be degraded.

Furthermore, in the arrangement described in Japanese Patent No. 4132820, when press forming the metal element from the metal element material using the mold, since the amount of material of the metal element material that is pushed aside by the mold is large, there is a possibility that the pressing load required will become large or the durability of the mold will be degraded.

Moreover, in the arrangement described in Japanese Patent Application Laid-open No. 2013-130204, since the metal element is assembled from the first element and the second element, which are two separate members, there is a problem that the number of components increases and the production cost rises.

SUMMARY OF THE INVENTION

The present invention has been accomplished in light of the above circumstances, and it is an object thereof to simply produce a metal element having a sharp rocking edge at a position where it overlaps a front edge of a saddle face while enhancing durability of a mold by reducing pressing load for a body part of the metal element and making a plate thickness of all parts of the metal element uniform.

In order to achieve the object, according to a first aspect of the present invention, there is provided a method for producing a metal element for a continuously variable transmission, in which the metal element is produced by, using a mold, press forming and punching out a band-shaped metal element material having a constant section, the metal element comprising a pair of ring slots into which a pair of metal rings are fitted, a neck part that is positioned between the pair of ring slots, an ear part that is connected to a radially outer side of the neck part, and a body part that has formed thereon a saddle face connected to a radially inner side of the neck part and supporting an inner peripheral face of the metal ring, a front face of the body part having formed thereon a rocking edge extending in a left-and-right direction so as to overlap a front edge of the saddle face and an inclined face extending from the rocking edge radially inward and rearward, wherein an inclined face-corresponding part of the metal element material that corresponds to the inclined face of the metal element comprises a first inclined face-corresponding portion that is inclined rearward at a first inclination angle from a rocking edge-corresponding part that corresponds to the rocking edge of the metal element, and a second inclined face-corresponding portion that is inclined rearward at a second inclination angle that is larger than the first inclination angle from a radially inner end of the first inclined face-corresponding portion, the mold comprises a first inclined face-molding portion that is inclined rearward at the first inclination angle from a rocking edge-molding portion that abuts against the rocking edge-corresponding part, and at a time of press forming, the first inclined face-molding portion abuts against the first inclined face-corresponding portion of the metal element material to form a gap between the first inclined face-molding portion and the second inclined face-corresponding portion.

In accordance with the first aspect of the present invention, when molding an inclined face extending radially inward and rearward from the rocking edge formed so as to coincide with the front edge of the saddle face of the body part of the metal element by press forming a metal element material using a mold, since the inclined face-corresponding part of the metal element material, which corresponds to the inclined face of the metal element, includes the first inclined face-corresponding portion inclined rearward at the first inclination angle from the rocking edge-corresponding part, which corresponds to the rocking edge of the metal element, and the second inclined face-corresponding portion inclined rearward at the second inclination angle, which is larger than the first inclination angle, from the radially inner end of the first inclined face-corresponding portion, and the mold includes the first inclined face-molding portion inclined rearward at the first inclination angle from the rocking edge-molding portion abutting against the rocking edge-corresponding part, at a time of press forming the first inclined face-molding portion abuts against the first inclined face-corresponding portion of the metal element material to form a gap between the first inclined face-molding portion and the second inclined face-corresponding portion. As a result, not only is it possible to reduce the pressing load and enhance the durability of the mold since the amount of material of the metal element material that is crushed when press forming the first inclined face-corresponding part can be minimized, but it is also possible to prevent the plate thickness of the body part in the vicinity of the rocking edge of the metal element from decreasing with respect to the plate thickness of the ear part due to the amount of material flowing toward the radially inner side of the metal element material from the first inclined face-corresponding part being reduced.

According to a second aspect of the present invention, in addition to the first aspect, a recess part that is recessed toward a rear is formed at a position, corresponding to the ring slot and the neck part of the metal element, of a front face of the metal element material.

In accordance with the second aspect of the present invention, since the recess part recessed toward the rear is formed at a position, corresponding to the ring slot and the neck part of the metal element, of the front face of the metal element material, it is possible, by processing a sharp rocking edge of the metal element in advance as an edge of the recess part of the metal element material, to prevent rollover from occurring on the rocking edge due to the shear load when punching out the recess part of the metal element material using a mold in order to produce the metal element, thus enhancing the precision with which the rocking edge is processed.

According to a third aspect of the present invention, in addition to the first aspect, the mold comprises a projecting portion that is formed at a position corresponding to a radially inner side of the rocking edge of the metal element and a recess portion that is formed on a radially inner side of the projecting portion.

In accordance with the third aspect of the present invention, since the mold includes the projecting portion formed at a position corresponding to the radially inner side of the rocking edge of the metal element, part of the material of the metal element material pressed by means of the projecting part of the mold flows toward the radially outer side, thus preventing rollover from occurring on the rocking edge of the metal element and thereby enabling a metal element having a high precision rocking edge to be easily produced. Another part of the material of the metal element material pressed by means of the projecting part flows toward the radially inner side, but absorbing the material flowing toward the radially inner side with the recess part of the mold enables the required pressing load of the mold to be reduced and the durability of the mold to be enhanced.

According to a fourth aspect of the present invention, there is provided a metal element for a continuously variable transmission produced by the method according to the third aspect, wherein the inclined face of the metal element comprises a projecting portion that is formed by means of a recess portion of the mold, and an inclination angle formed between a radial direction and a tangent drawn from the rocking edge to the projecting portion of the inclined face is larger than a maximum swing angle around the rocking edge of the metal element.

In accordance with the fourth aspect of the present invention, since the inclined face of the metal element includes the projecting portion formed by means of the recess portion of the mold, and the inclination angle formed between the radial direction and the tangent drawn from the rocking edge to the projecting portion of the inclined face is larger than the maximum swing angle around the rocking edge of the metal element, even when the metal belt is wound around a pulley and adjacent metal elements swing with a maximum swing angle around the rocking edge, it is possible to prevent the projecting part on the inclined face of one metal element from contacting another metal element, and swinging of the metal element around the rocking edge is not inhibited.

Note that a neck part-corresponding part 25' of embodiments corresponds to the recess part of the present invention, and a counterpunch 47 of the embodiments corresponds to the mold of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 2 is a perspective view of part of a metal belt (first embodiment).

FIG. 13 is a perspective view of part of a metal belt (second embodiment).

DESCRIPTION OF THE PREFERRED EMBODIMENTS

A first embodiment of the present invention is explained below by reference to FIG. 1 to FIG. 10.

Figure 1:
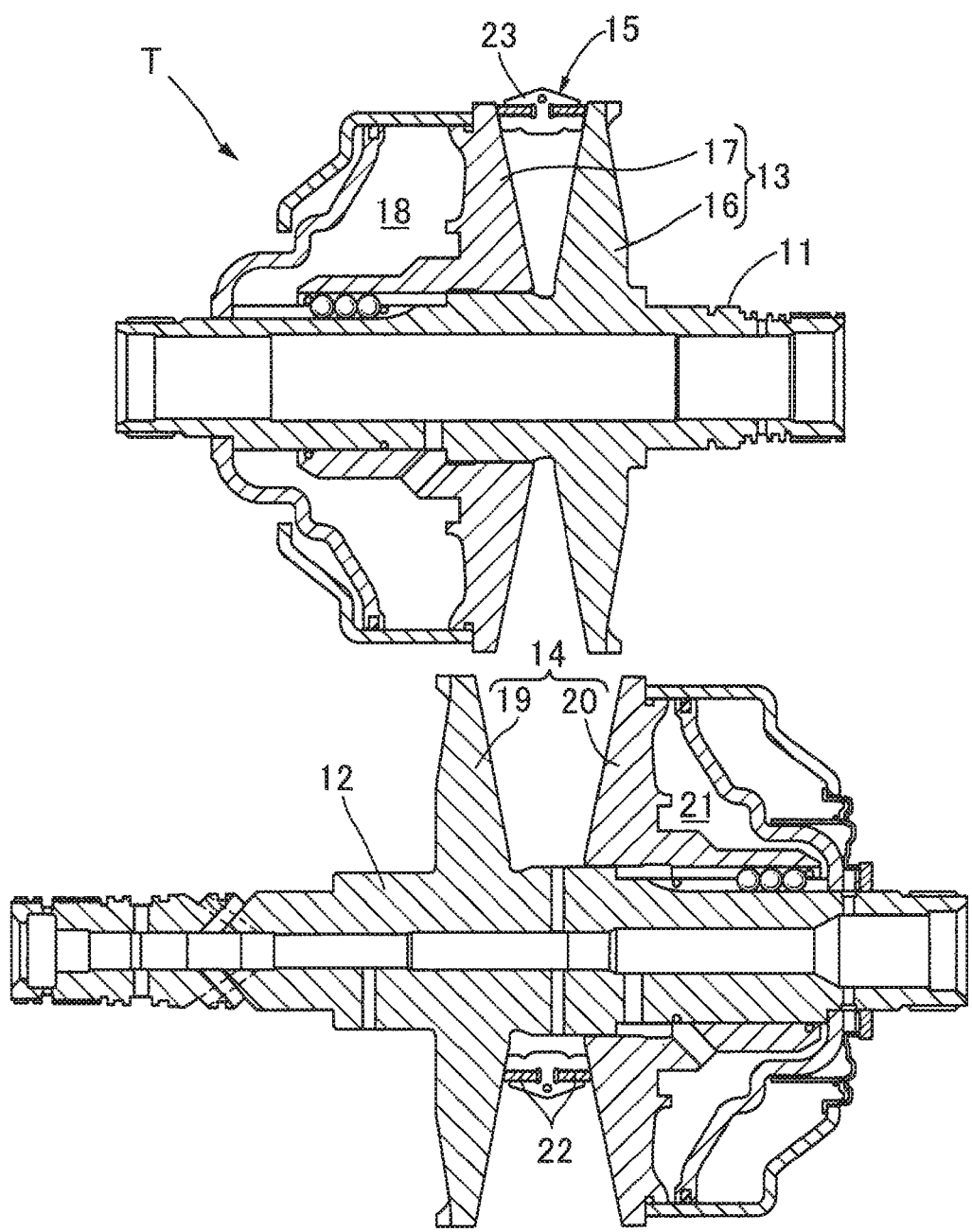
FIG. 1 is a diagram showing the overall arrangement of a belt type continuously variable transmission (first and second embodiments).

FIG. 1 shows a schematic structure of a belt type continuously variable transmission T mounted on an automobile; the belt type continuously variable transmission T includes a drive shaft 11 that is connected to an engine and a driven shaft 12 that is connected to a drive wheel, and an endless metal belt 15 is wound around a drive pulley 13 that is provided on the drive shaft 11 and a driven pulley 14 that is provided on the driven shaft 12. The drive pulley 13 includes a fixed side pulley half 16 that is fixedly provided on the drive shaft 11 and a movable side pulley half 17 that can move toward and away from the fixed side pulley half 16, and the movable side pulley half 17 is urged toward the fixed side pulley half 16 by oil pressure acting on an oil chamber 18. The driven pulley 14 includes a fixed side pulley half 19 that is fixedly provided on the driven shaft 12 and a movable side pulley half 20 that can move toward and away from the fixed side pulley half 19, and the movable side pulley half 20 is urged toward the fixed side pulley half 19 by oil pressure acting on an oil chamber 21.

Figure 3:
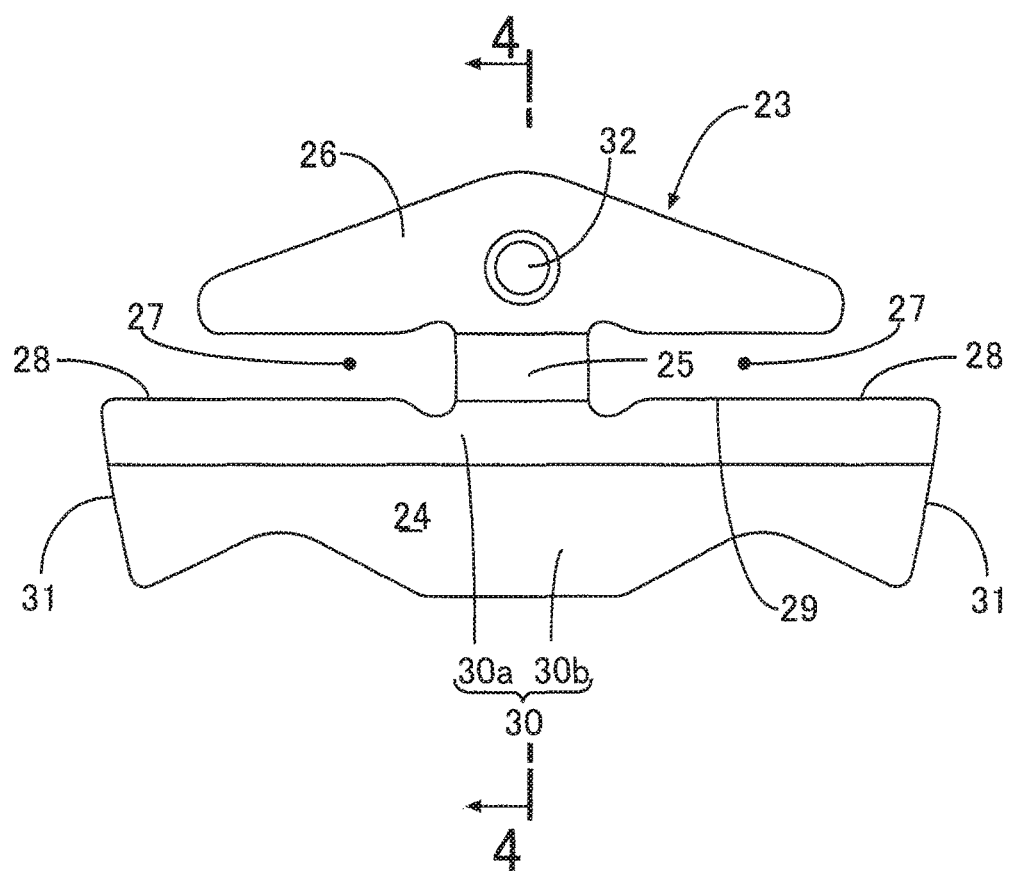
FIG. 3 is a front view of a metal element (first embodiment).
Figure 4:
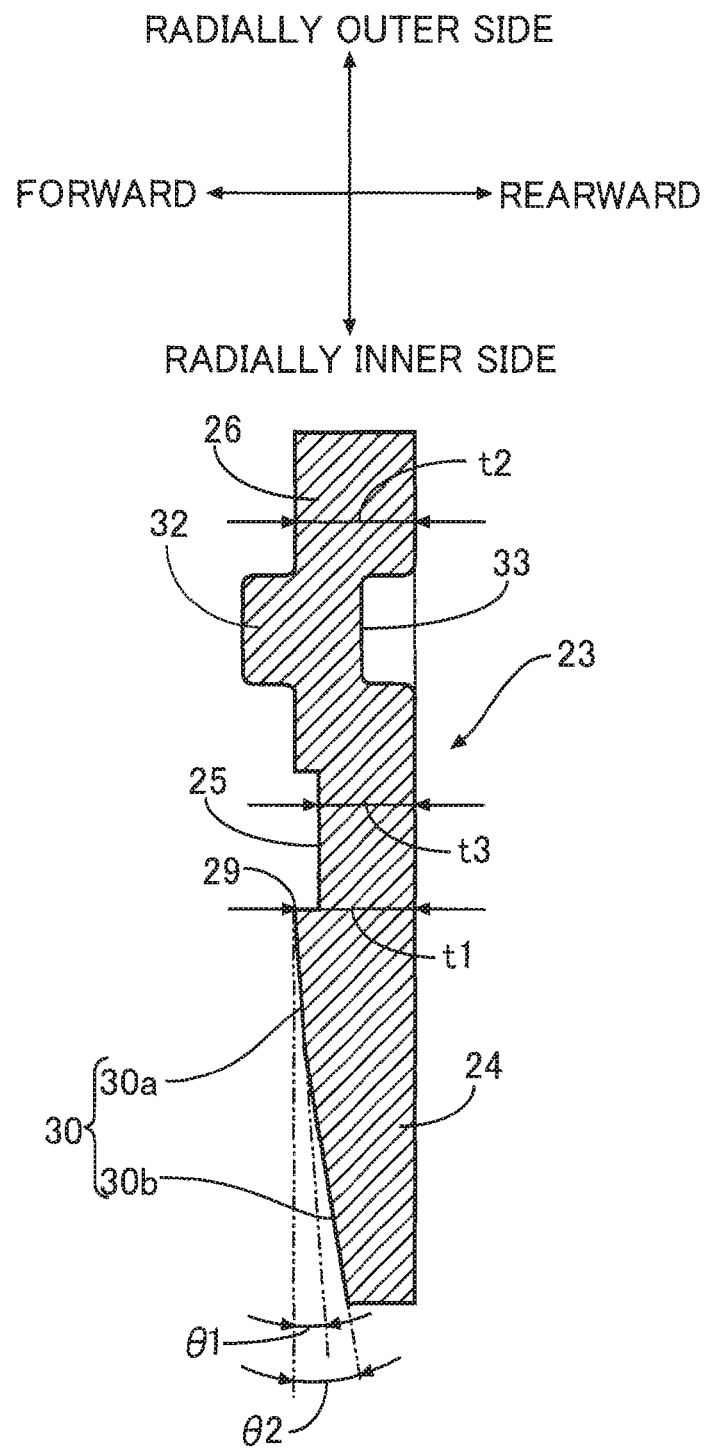
FIG. 4 is a sectional view along line 4-4 in FIG. 3 (first embodiment).

As shown in FIG. 2 to FIG. 4, the metal belt 15 is formed by supporting a large number of metal elements 23 on a pair of left and right metal rings 22. In the present specification, the direction in which the metal belt 15 travels is defined as forward in the fore-and-aft direction; in a state in which the metal belt 15 is wound around the drive pulley 13 and the driven pulley 14 the outer peripheral side of the drive pulley 13 and the driven pulley 14 is defined as the outside in the radial direction, and a direction that is orthogonal to the fore-and-aft direction and the radial direction is defined as the left-and-right direction. Furthermore, with regard to a metal element material 23' (see FIG. 5) that is a material for the metal element 23 and a punching machine 41 (see FIG. 6) for molding and punching out the metal element 23 from the metal element material 23', directions that correspond to the fore-and-aft direction, the radial direction, and the left-and-right direction of the metal element 23 are defined as the fore-and-aft direction, the radial direction, and the left-and-right direction therefor.

The metal element 23 produced from the metal element material 23' includes a body part 24 extending in the left-and-right direction, a neck part 25 extending from a middle part in the left-and-right direction of the body part 24 toward the radially outer side, and a substantially triangular ear part 26 connected to the radially outer end of the neck part 25, and a pair of ring slots 27 opening outward in the left-and-right direction are formed between the body part 24, the neck part 25, and the ear part 26, the metal ring 22 being fitted into the ring slots 27. A saddle face 28 is formed at the radially outer end of the body part 24 facing the ring slot 27, an inner peripheral face of the metal ring 22 being seated on the saddle face 28, a rocking edge 29 extending in the left-and-right direction is formed at the radially outer end of a front face of the body part 24, and an inclined face 30 that is inclined radially inward and rearward from the rocking edge 29 is formed on the front face of the body part 24. The rocking edge 29 overlaps the front edge of the saddle face 28, and the rocking edge 29 is therefore positioned at the radially outer end of the front face of the body part 24.

A pulley abutment face 31 is formed at left and right ends of the body part 24 of the metal element 23, the pulley abutment face 31 abutting against V-faces of the drive pulley 13 and the driven pulley 14. Furthermore, a projecting part 32 is formed on a front face of the ear part 26 of the metal element 23, the projecting part 32 being capable of fitting into a recess part 33 formed in a rear face of the ear part 26.

The inclined face 30 of the metal element 23 is formed from a first inclined face 30a that is inclined radially inward and rearward from the rocking edge 29 at a first inclination angle $\theta 1$, and a second inclined face 30b that is inclined radially inward and rearward from the radially inner end of the first inclined face 30a at a second inclination angle $\theta 2$, and the fore-and-aft direction plate thickness of the body part 24 gradually decreases toward the radially inner side within the range of the inclined face 30. The fore-and-aft direction plate thickness of the body part 24 attains a maximum plate thickness t1 at the position of the rocking edge 29, and this maximum plate thickness t1 coincides with a fore-and-aft direction plate thickness t2 of the constant plate thickness ear part 26 of the metal element 23. Furthermore, a front face of the neck part 25 is recessed rearward from the front face of the ear part 26 and the rocking edge 29, and a fore-and-aft direction plate thickness t3 thereof is smaller than the fore-and-aft direction plate thickness t2 of the ear part 26 and the maximum plate thickness t1 of the body part 24 of the rocking edge 29.

Therefore, when adjacent metal elements 23 are aligned in a chord portion of the metal belt 15, the front face of the ear part 26 of the metal element 23 on the rear side abuts against the rear face of the ear part 26 of the metal element 23 on the front side, and the rocking edge 29 of the metal element 23 on the rear side abuts against the upper end (the rear edge of the saddle face 28) of the body part 24 of the metal element 23 on the front side. Furthermore, with respect to the rear face of the metal element 23 on the front side, the metal element 23 on the rear side can swing with the rocking edge 29 as a fulcrum, and this enables the metal belt 15 to be wound around the drive pulley 13 and the driven pulley 14.

Figure 5:
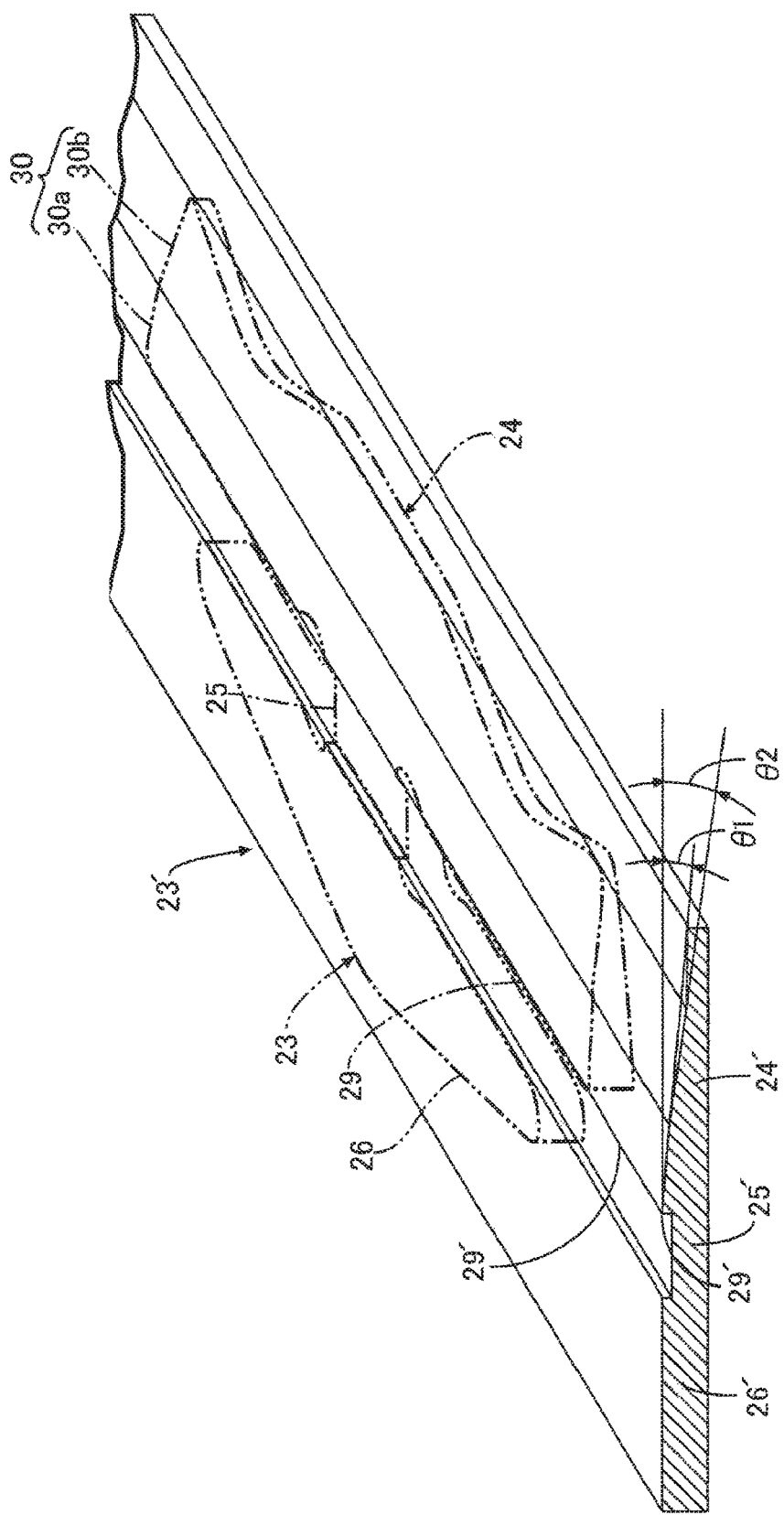
FIG. 5 is a perspective view of a metal element material (first embodiment).

As shown in FIG. 5, the metal element material 23', which serves as a material when the metal element 23 is produced, is formed from a band-shaped metal plate that is rolled so as to have a constant section in the longitudinal direction. The metal element material 23' includes an ear part-corresponding part 26', a neck part-corresponding part 25', and a body part-corresponding part 24' that correspond to the ear part 26, the neck part 25, and the body part 24 of the metal element 23 respectively.

The ear part-corresponding part 26' has a constant plate thickness that is substantially the same as the plate thickness t2 of the ear part 26, and the neck part-corresponding part 25' has a constant plate thickness that is substantially the same as the plate thickness t3 of the neck part 25. The body part-corresponding part 24' has substantially the same plate thickness as the maximum plate thickness t1 of the body part 24 at the position of a rocking edge-corresponding part 29', and the plate thickness decreases therefrom toward the radially inner side. That is, an inclined face-corresponding part 30' of the body part-corresponding part 24' of the metal element material 23' is formed from a first inclined face-corresponding portion 30a' that is inclined radially inward and rearward from the rocking edge-corresponding part 29' at the first inclination angle θ1, and a second inclined face-corresponding portion 30b' that is inclined radially inward and rearward from the radially inner end of the first inclined face-corresponding portion 30a' at the second inclination angle θ2.

As described above, the sectional shape of the metal element material 23' substantially coincides with the sectional shape of the metal element 23 except for the point that it does not have portions corresponding to the projecting part 32 and the recess part 33 of the metal element 23. The rocking edge-corresponding part 29', which is an end part on the radially inner side of the neck part-corresponding part 25' forming a groove-shaped recess part, is processed into an edge shape having an acute angle.

Figure 6:
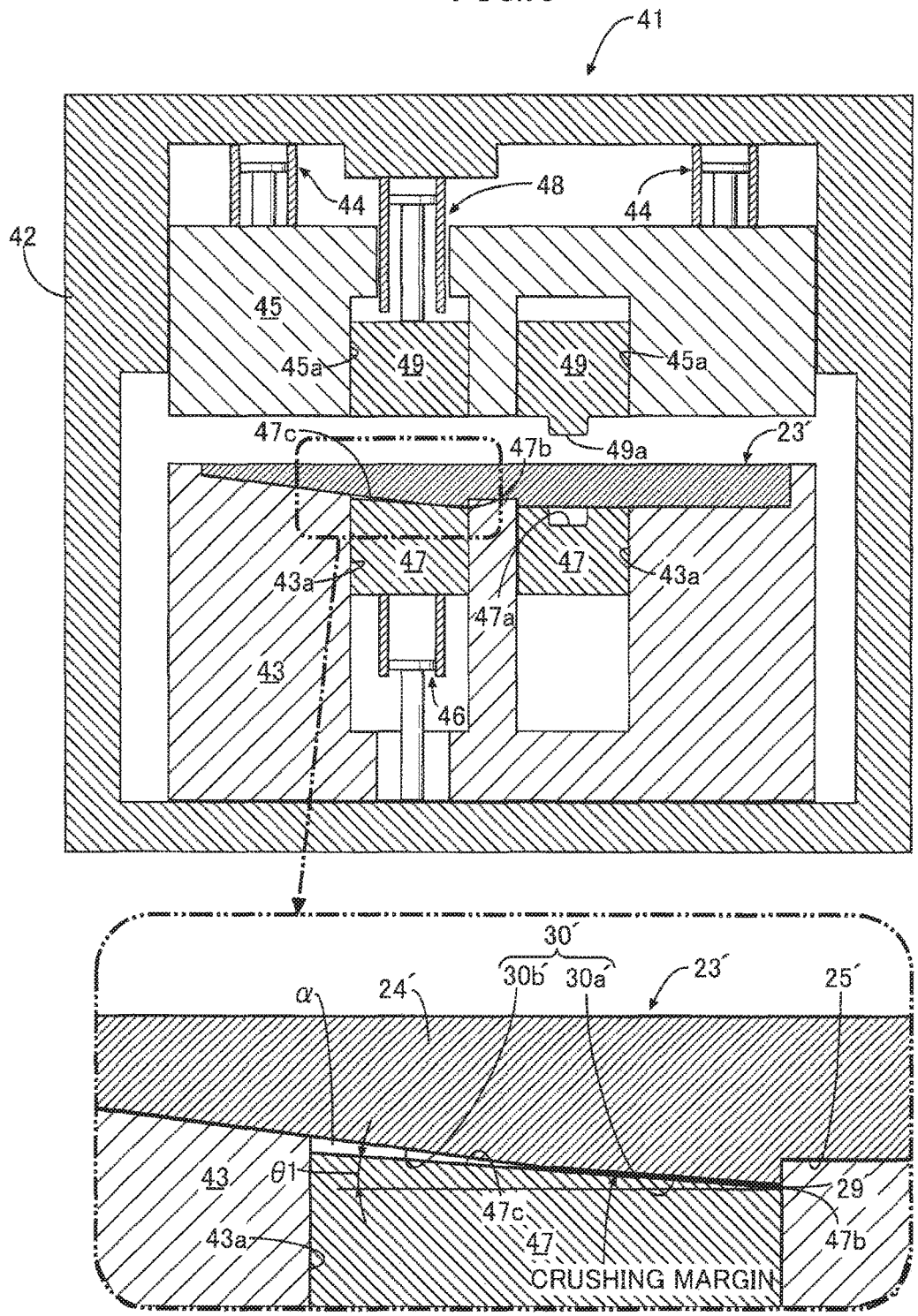
FIG. 6 is a sectional view of a punching machine and the metal element material (first embodiment).

As shown in FIG. 6, a punching machine 41 for punching out the metal element 23 from the metal element material 23' includes a lower die 43 that is fixed to a lower part of a frame body 42, an upper die 45 that is supported on an upper part of the frame body 42 so that it can freely ascend and descend and that is driven up and down by a die drive cylinder 44, a counterpunch 47 that is fitted into an upper face-opening recess portion 43a formed in the lower die 43 and driven up and down by means of a counterpunch drive cylinder 46, and a main punch 49 that is fitted into a lower face-opening recess portion 45a formed in the upper die 45 and driven up and down by means of a main punch drive cylinder 48.

In FIG. 6, the counterpunch 47 and the main punch 49 are illustrated so as to separately have a portion for molding the ear part 26 of the metal element 23 and a portion for molding the body part 24 of the metal element 23, but in reality the counterpunch 47 and the main punch 49 are both single members.

The outline shapes of the counterpunch 47 and the main punch 49 are the same as the outline shape of the metal element 23. Formed on the counterpunch 47 are a projecting part-molding portion 47a for molding the projecting part 32 of the metal element 23, a rocking edge-molding portion 47b for molding the rocking edge 29 of the metal element 23, and a first inclined face-molding portion 47c for molding the first inclined face 30a of the metal element 23, and formed on the main punch 49 is a recess part-molding portion 49a for molding the recess part 33 of the metal element 23.

The first inclined face-molding portion 47c of the counterpunch 47 is parallel to the first inclined face-corresponding portion 30a' of the inclined face-corresponding part 30' of the metal element material 23', and the first inclined face-molding portion 47c and the first inclined face-corresponding portion 30a' are both inclined only at the first inclination angle θ1. Therefore, the first inclined face-molding portion 47c includes a gap a between the first inclined face-molding portion 47c and the second inclined face-corresponding portion 30b' of the inclined face-corresponding part 30' of the metal element material 23'.

The operation of the first embodiment of the present invention having the above arrangement is now explained.

Figure 7:
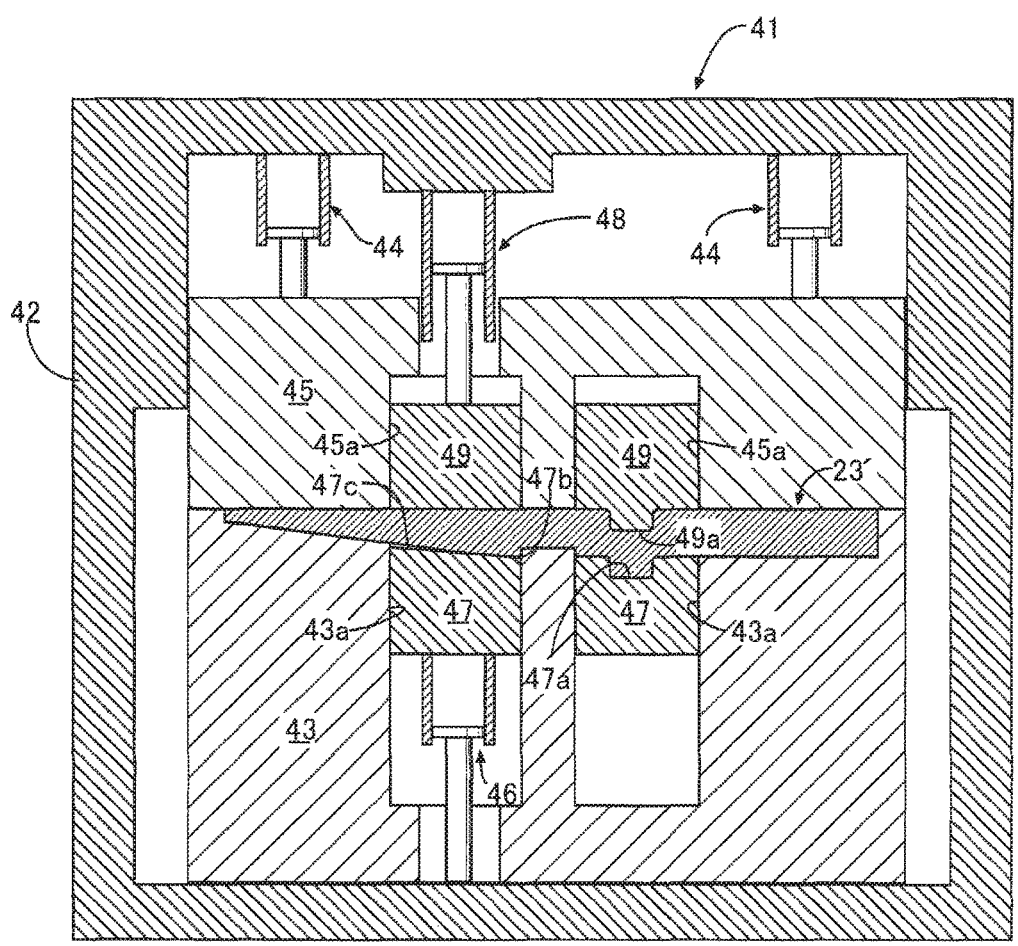
FIG. 7 is a diagram corresponding to FIG. 6 for explaining the operation (first embodiment).

As shown in FIG. 6, the metal element material 23', which is produced in advance, is placed on the lower die 43 and the counterpunch 47 of the punching machine 41. Next, as shown in FIG. 7, the upper die 45 is made to descend by means of the die drive cylinder 44, the metal element material 23' is sandwiched between the lower die 43 and the upper die 45 so as to fix it, the main punch 49 is then made to descend by means of the main punch drive cylinder 48, and the metal element material 23' is sandwiched between the counterpunch 47 and the main punch 49 to thus carry out press forming. As a result, the projecting part 32 and the recess part 33 of the metal element 23 are molded by means of the projecting part-molding portion 47a of the counterpunch 47 and the recess part-molding portion 49a of the main punch 49, and the first inclined face-corresponding portion 30a' of the metal element material 23b' (that is, the first inclined face 30a of the metal element 23) is molded by means of the first inclined face-molding portion 47c of the counterpunch 47.

Figure 8:
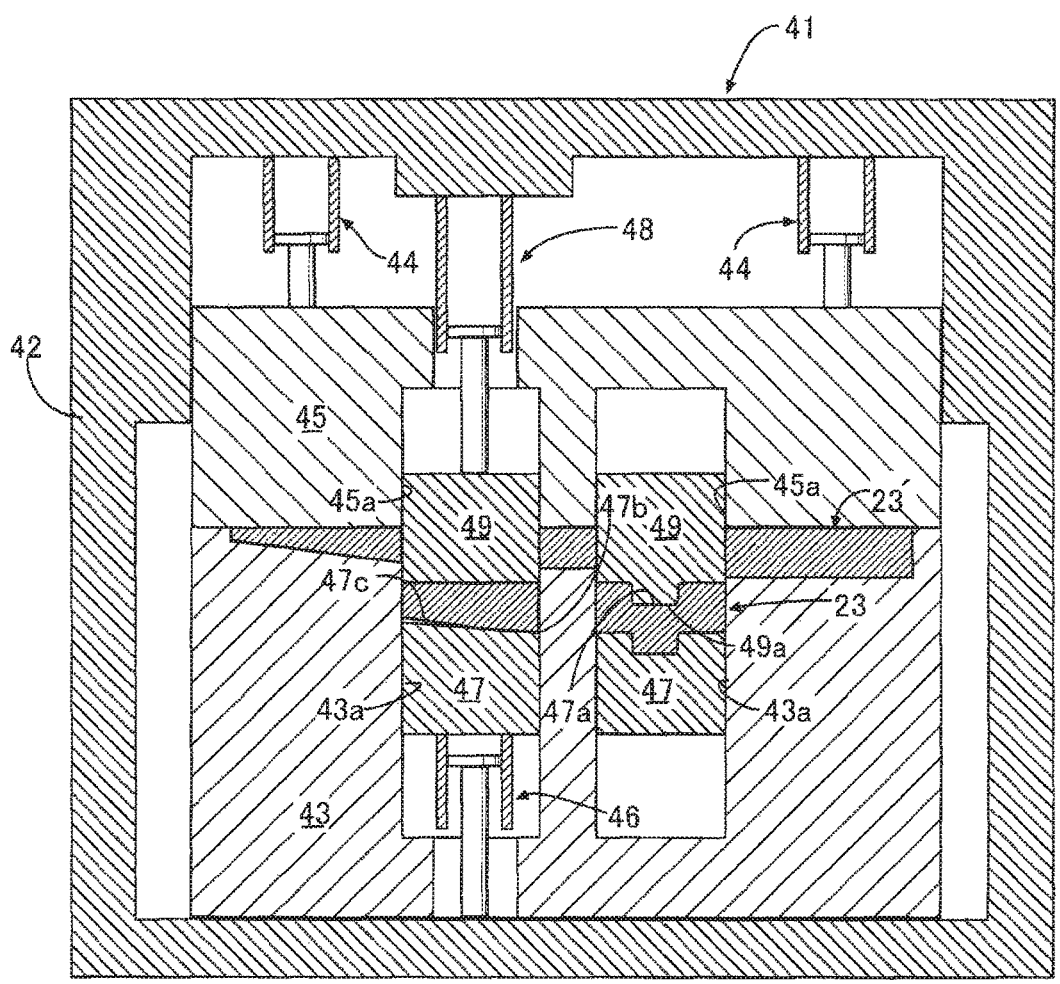
FIG. 8 is a diagram corresponding to FIG. 6 for explaining the operation (first embodiment).

When in this way press forming of the metal element 23 is completed, as shown in FIG. 8, the counterpunch 47 and the main punch 49 are made to descend by means of the counterpunch drive cylinder 46 and the main punch drive cylinder 48 with respect to the lower die 43 and the upper die 45, thus punching out the metal element 23 from the metal element material 23'.

Figure 9:
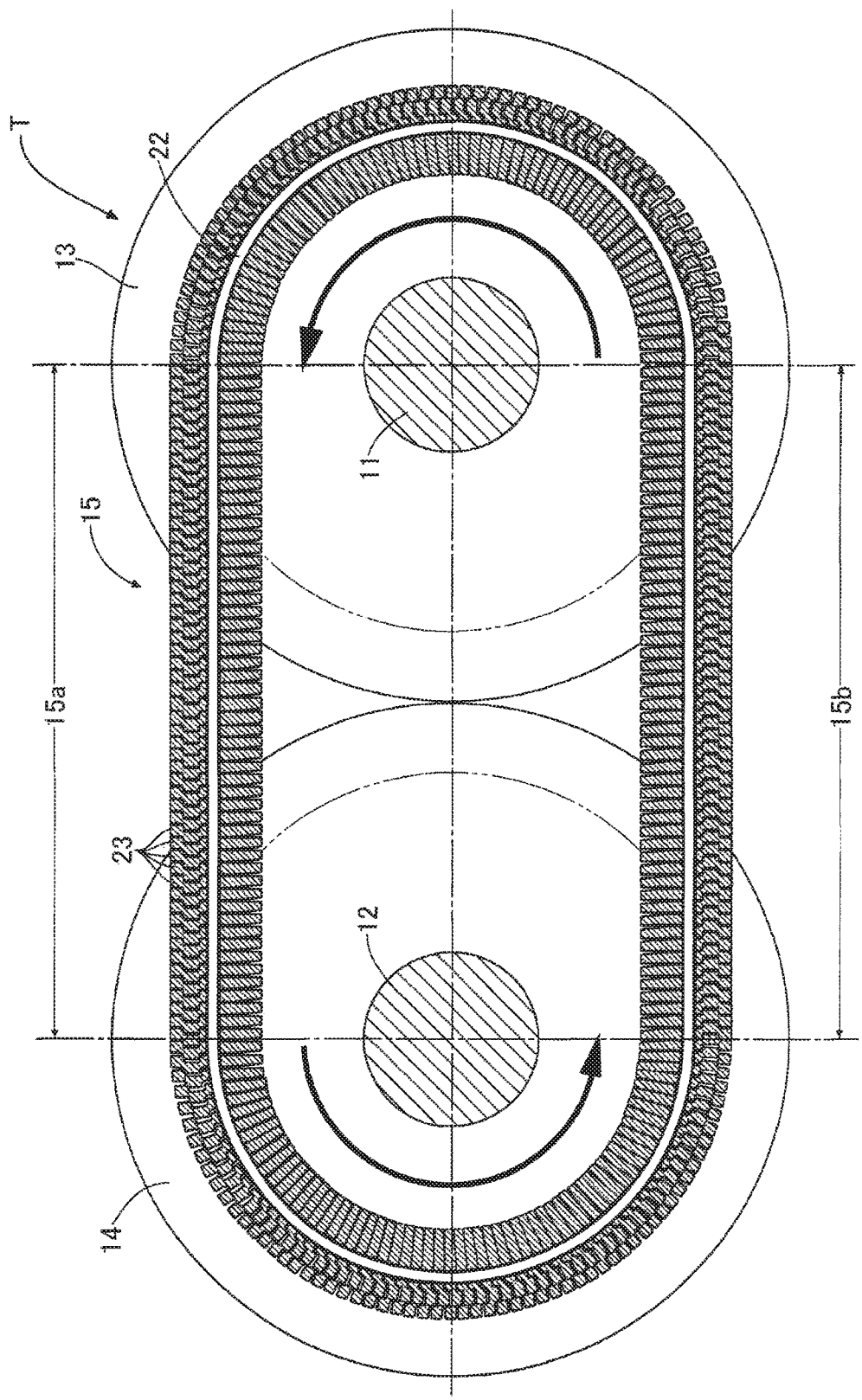
FIG. 9 is a diagram showing a state in which the metal belt is wound around a drive pulley and a driven pulley (first embodiment).

As shown in FIG. 9, the metal belt 15 wound around the drive pulley 13 and the driven pulley 14 rotating in the direction shown by the arrows includes a drive-side chord portion 15a and a return-side chord portion 15b extending linearly between the drive pulley 13 and the driven pulley 14, adjacent metal elements 23 on the drive-side chord portion 15a contact each other, and the pushing force transmits the driving force from the drive pulley 13 to the driven pulley 14.

Adjacent front and rear metal elements 23 on the drive-side chord portion 15a contact each other via the ear part 26 having the fore-and-aft direction plate thickness t2 and a part that has the fore-and-aft direction plate thickness t1, which is the same as the fore-and-aft direction plate thickness t2, of the rocking edge 29 of the body part 24, but with regard to a conventional metal element 23 since the plate thickness t1 of the portion of the rocking edge 29 is slightly smaller than the plate thickness t2 of the ear part 26, accumulation of the difference in plate thickness causes the drive-side chord portion 15a to curve toward the radially outer side, and there is the problem that the efficiency with which the driving force is transmitted is degraded.

The reason why in the conventional metal element 23 the plate thickness of the body part 24 is smaller than the plate thickness of the ear part 26 is explained below.

Figure 11:
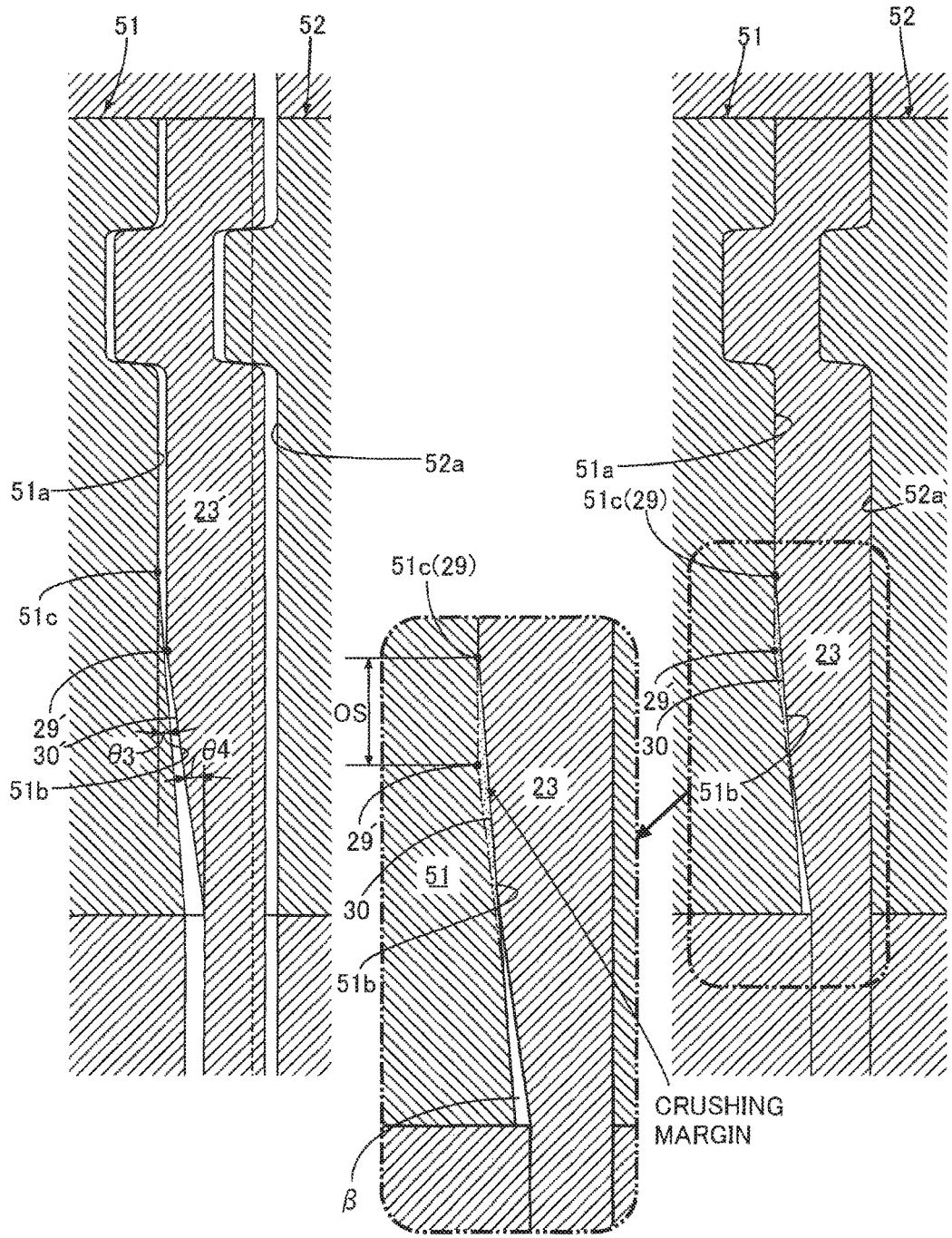
FIGS. 11A and 11B are each a sectional view of a punching machine and a metal element material (conventional example).

FIGS. 11A and 11B each show a conventional example described in Japanese Patent No. 4132820; a punch for pressing the metal element material 23' to carry out finishing molding of the metal element 23 includes a counterpunch 51 for molding a front face of the metal element 23 and a main punch 52 for molding a rear face of the metal element 23. The molding portion 52a of the main punch 52 basically has a flat face, but the molding part of the counterpunch 51 includes a flat first molding portion 51a for molding a portion that is further radially outside than the rocking edge 29 and a flat second molding portion 51b for molding the inclined face 30 that is further radially inside than the rocking edge 29, and a rocking edge-molding portion 51c extending in the left-and-right direction is formed on the border between the first molding portion 51a and the second molding portion 51b.

The metal element material 23' includes the rocking edge-corresponding part 29' corresponding to the rocking edge 29 of the metal element 23 and the inclined face-corresponding part 30' corresponding to the inclined face 30 of the metal element 23. The rocking edge-corresponding part 29' of the metal element material 23' is displaced toward the radially inner side with respect to the rocking edge-molding portion 51c of the counterpunch 51 only by an offset OS.

The molding portion 52a of the main punch 52 and the first molding portion 51a of the counterpunch 51 are parallel to the radial direction, but the second molding portion 51b of the counterpunch 51 is inclined with respect to the radial direction at an inclination angle θ3. The inclined face-corresponding part 30' of the metal element material 23' is also inclined with respect to the radial direction at an inclination angle θ4, but the inclination angle θ4 of the inclined face-corresponding part 30' is set larger than the inclination angle θ3 of the second molding portion 51b of the counterpunch 51.

When the metal element material 23' is pressed by means of the counterpunch 51 and the main punch 52, the material (see shaded part in enlarged part of FIG. 11B) of the inclined face-corresponding part 30' of the metal element material 23' flows toward the radially outer side by virtue of the offset OS, thus preventing the plate thickness of the body part 24 further radially outside than the rocking edge 29 from decreasing; since a gap 13 remains between the radially inner end of the inclined face 30 after molding and the second molding portion 51b, this gap 13 causes the material of the inclined face-corresponding part 30' of the metal element material 23' to flow toward the radially inner side, and there is a tendency for the plate thickness of the body part 24 further radially outside than the rocking edge 29 to become smaller than the plate thickness of the ear part 26.

Figure 12:
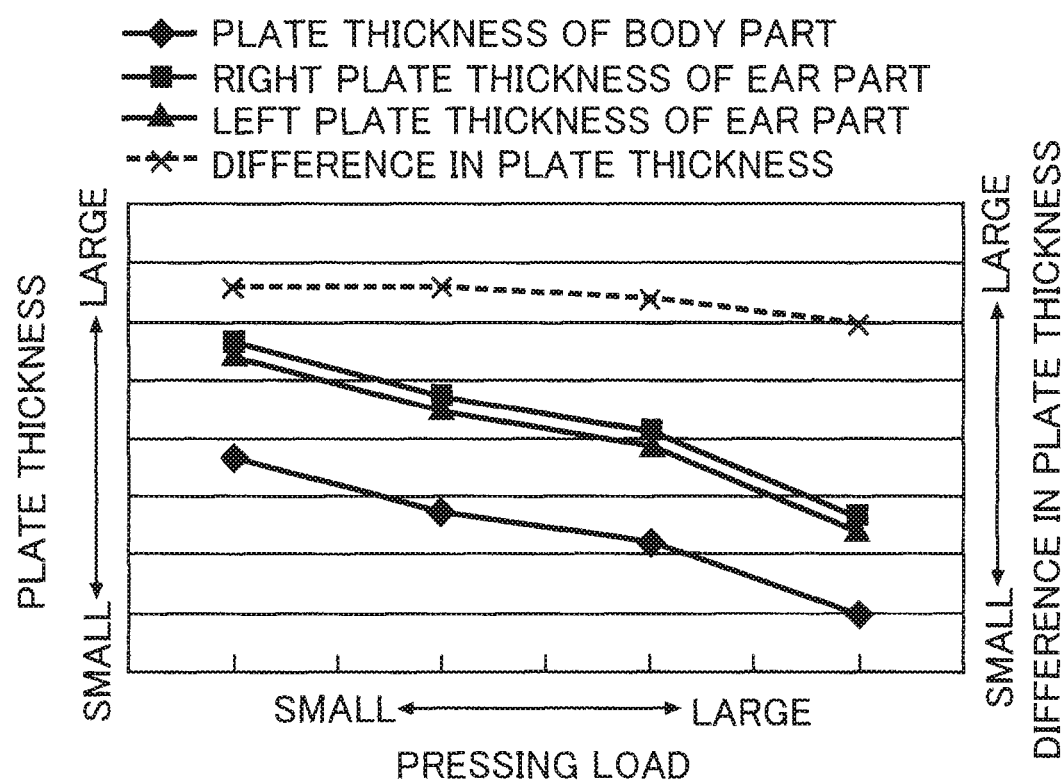
FIG. 12 is a graph showing change in difference in plate thickness according to pressing load (conventional example).

FIG. 12 shows how, in the above conventional example, the plate thickness (body part plate thickness) of a middle part in the left-and-right direction of the body part 24 further radially outside than the rocking edge 29, the plate thicknesses (left and right plate thicknesses of the ear part) of the left and right end parts of the ear part 26, and the difference in plate thickness of the average value of the left and right plate thicknesses of the ear part with respect to the body part plate thickness change according to the pressing load. As is clear from this figure, regardless of the magnitude of the pressing load, the difference in plate thickness of the average value of the left and right plate thicknesses of the ear part with respect to the body part plate thickness is large.

In contrast to the above conventional example, in the first embodiment shown in FIG. 6, since the first inclined face-molding portion 47c of the counterpunch 47 abuts only against the first inclined face-corresponding portion 30a' of the metal element material 23' and in parallel thereto and presses it, but does not abut against the second inclined face-corresponding portion 30b' of the metal element material 23', the amount of material pushed out by the first inclined face-corresponding portion 30a' being pressed (see solid black area in enlarged part of FIG. 6) is much smaller than that in the conventional example of FIGS. 11A and 11B, the pressing load of the counterpunch 47 and the main punch 49 can be made smaller by a corresponding amount, and the durability of the counterpunch 47 and the main punch 49 improves. Moreover, since the amount of material flowing at the time of press forming is small, the inconvenience of the plate thickness of the vicinity of the rocking edge 29 of the body part 24 decreasing with respect to the plate thickness of the ear part 26 of the metal element 23 is eliminated, and degradation of the power transmission efficiency of the metal belt 15 is also eliminated.

Figure 10:
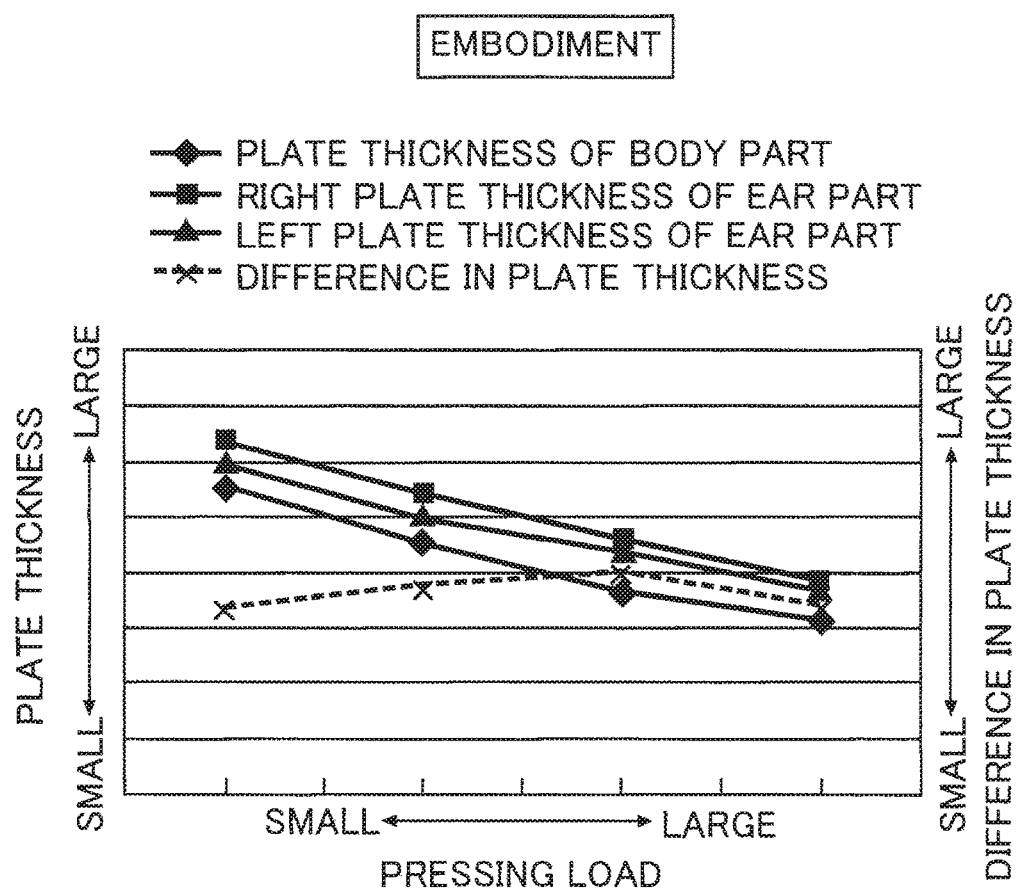
FIG. 10 is a graph showing change in difference in plate thickness according to pressing load (first embodiment).

FIG. 10 shows how, in the first embodiment, the body part plate thickness, the plate thicknesses of the left and right parts of the ear part, and the difference in plate thickness of the average value of the plate thicknesses of the left and right parts of the ear part with respect to the body part plate thickness change according to the pressing load. As is clear from the figure, in accordance with the first embodiment, regardless of the pressing load, compared with the conventional example explained by reference to FIG. 12, the difference in plate thickness of the metal element 23 can be greatly reduced.

Furthermore, when the metal element 23 is produced from the metal element material 23' using the punching machine 41, the rocking edge 29 of the metal element 23 is molded by punching out a portion corresponding to the ring slot 27 by shearing it. In general, when a metal member is cut by shearing, since part of the mass of the metal member undergoes plastic deformation and is stretched in a border part between the die and the punch, the edge of the sheared section sometimes shows rollover (becomes rounded). However, when the rocking edge 29 of the metal element 23 shows rollover, the plate thickness of the body part 24 of the metal element 23 decreases in the vicinity of the rocking edge 29, a difference in plate thickness from the plate thickness of the ear part 26 occurs, and it is therefore necessary to mold the rocking edge 29 into a sharp shape without rollover.

In accordance with the first embodiment, the rocking edge 29 of the metal element 23 is cut in advance into a sharp shape as the rocking edge-corresponding part 29' of the metal element material 23', and when the neck part-corresponding part 25' of the metal element material 23' is punched out by shearing by means of the rocking edge-molding portion 47b of the counterpunch 47 at the time of production of the metal element 23, only the neck part-corresponding part 25' forming a groove-shaped recess part is punched out, and the sharp rocking edge 29, which has been cut, can be left as it is.

A second embodiment of the present invention is explained below by reference to FIG. 13 to FIG. 21.

In the first embodiment described above, the recess part 25' recessed toward the rear is formed at positions, corresponding to the ring slot 27 and the neck part 25 of the metal element 23, on the front face of the metal element material 23', but in this second embodiment, the mold 47 includes a projecting portion 47e formed at a position corresponding to the radially inner side of the rocking edge 29 of the metal element 23, and a recess portion 47f formed on the radially inner side of the projecting portion 47e. Since the arrangement is otherwise the same as the preceding embodiment, parts in FIG. 13 to FIG. 21 that correspond to the first embodiment are denoted by the same reference numerals and symbols, and duplication of the explanation is omitted. In the second embodiment, the counterpunch 47, which is a mold, has in addition to the first inclined face-molding portion 47c a second inclined face-molding portion 47d that is parallel to the second inclined face-corresponding portion 30b' of the inclined face-corresponding part 30' of the metal element material 23', but this second inclined face-molding portion 47d may be omitted, and a gap (a) may be formed in said portion.

Figure 14:
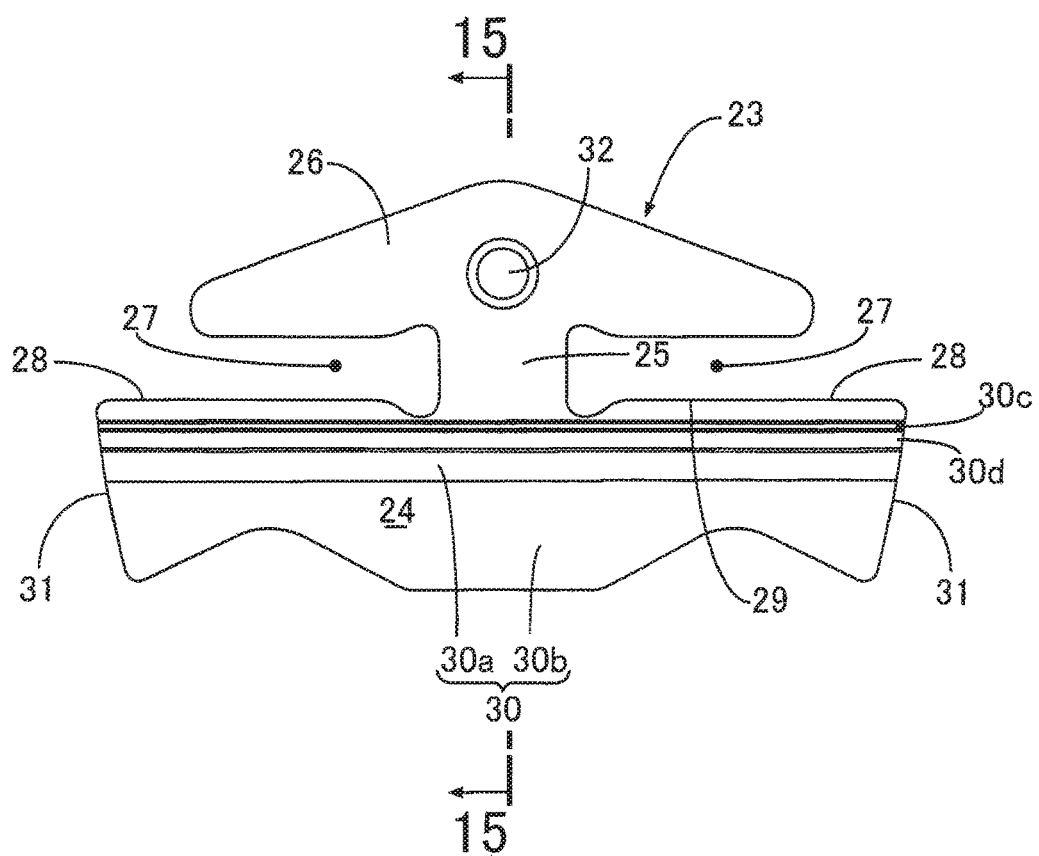
FIG. 14 is a front view of a metal element (second embodiment).
Figure 15:
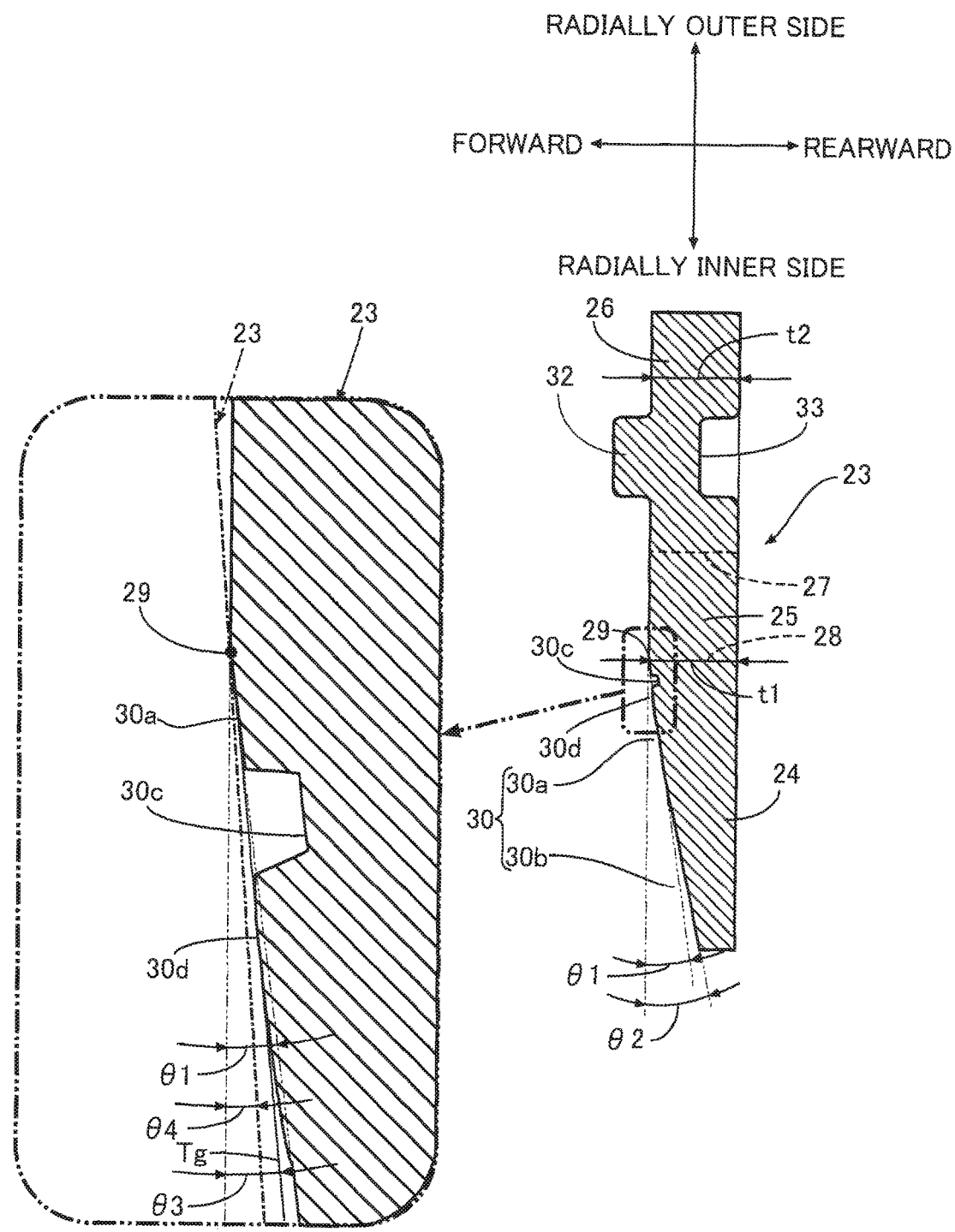
FIG. 15 is a sectional view along line 15-15 in FIG. 14 (second embodiment).

As shown in FIG. 13 to FIG. 15, the inclined face 30 of the metal element 23 is formed from a first inclined face 30a that is inclined radially inward and rearward from the rocking edge 29 at a first inclination angle θ1, and a second inclined face 30b that is inclined radially inward and rearward from the radially inner end of the first inclined face 30a at a second inclination angle θ2, and the fore-and-aft direction plate thickness of the body part 24 gradually decreases toward the radially inner side within the range of the inclined face 30. The first inclined face 30a includes a groove-shaped recess portion 30c extending in the left-and-right direction on the radially inner side of the rocking edge 29, and a ridge-shaped projecting portion 30d extending in the left-and-right direction on the radially inner side of the recess portion 30c. The recess portion 30c and the projecting portion 30d are formed secondarily when the metal element material 23' is press formed and punched out, and do not in themselves exhibit any special function at the time of power transmission. The fore-and-aft direction plate thickness of the body part 24 attains a maximum plate thickness t1 at the position of the rocking edge 29, and this maximum plate thickness t1 coincides with a fore-and-aft direction plate thickness t2 of the neck part 25 and the ear part 26, which have a constant plate thickness, of the metal element 23.

Therefore, when adjacent metal elements 23 are aligned in a chord portion of the metal belt 15, the front faces of the neck part 25 and the ear part 26 of the metal element 23 on the rear side abut against the rear faces of the neck part 25 and the ear part 26 of the metal element 23 on the front side, and the rocking edge 29 of the metal element 23 on the rear side abuts against the upper end (the rear edge of the saddle face 28) of the body part 24 of the metal element 23 on the front side. Furthermore, with respect to the rear face of the metal element 23 on the front side, the metal element 23 on the rear side can swing with the rocking edge 29 as a fulcrum, and this enables the metal belt 15 to be wound around the drive pulley 13 and the driven pulley 14.

Figure 16:
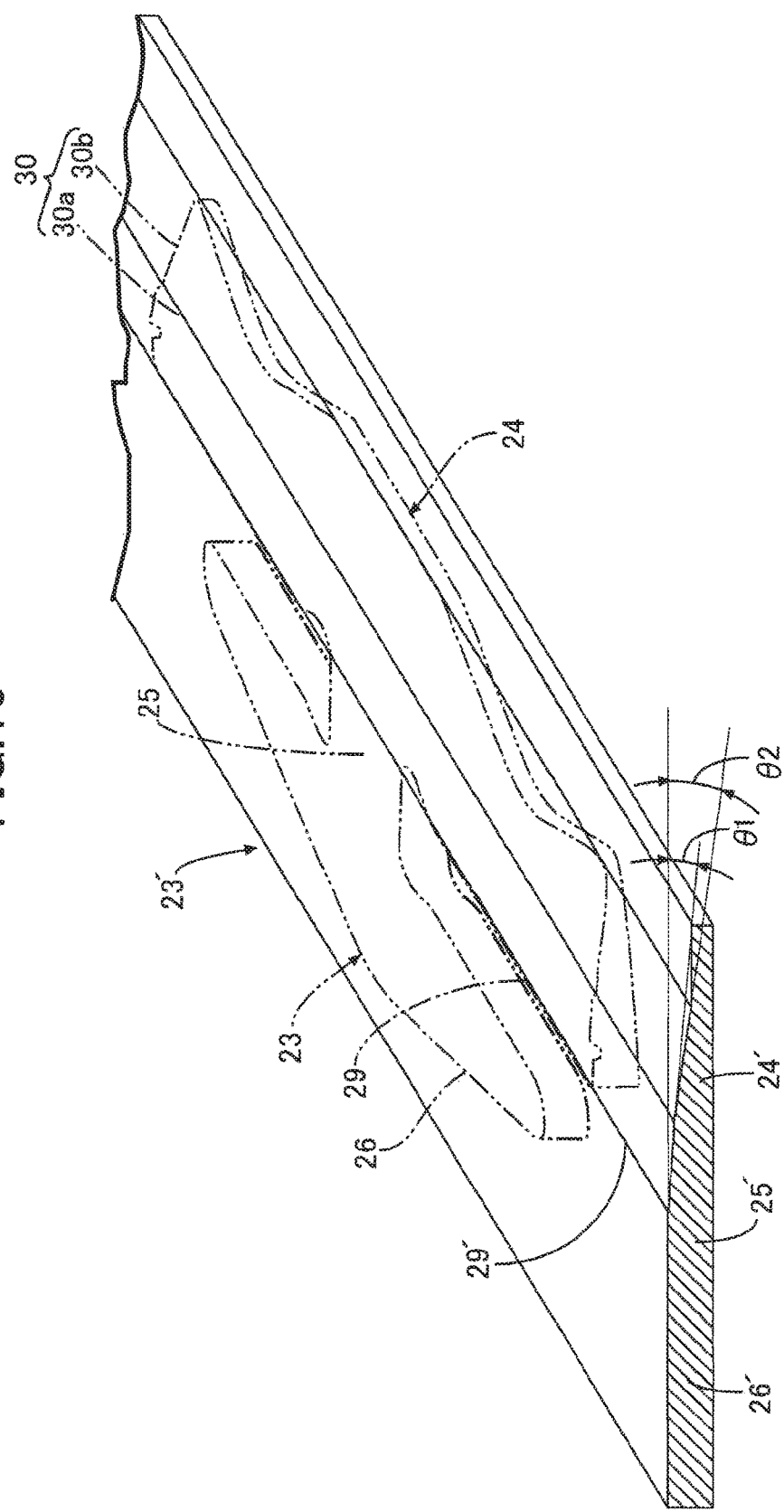
FIG. 16 is a perspective view of a metal element material (second embodiment).

As shown in FIG. 16, a metal element material 23', which serves as a material when the metal element 23 is produced, is formed from a band-shaped metal plate that is rolled so as to have a constant section in the longitudinal direction. The metal element material 23' includes an ear part-corresponding part 26', a neck part-corresponding part 25', and a body part-corresponding part 24' that correspond to the ear part 26, the neck part 25, and the body part 24 of the metal element 23 respectively.

The neck part-corresponding part 25' and the ear part-corresponding part 26' have a constant plate thickness that is substantially the same as the plate thickness t2 of the neck part 25 and the ear part 26. The body part-corresponding part 24' has substantially the same plate thickness as the maximum plate thickness t1 of the body part 24 at the position of the rocking edge-corresponding part 29', and the plate thickness decreases therefrom toward the radially inner side. That is, an inclined face-corresponding part 30' of the body part-corresponding part 24' of the metal element material 23' is formed from a first inclined face-corresponding portion 30a' that is inclined radially inward and rearward from the rocking edge-corresponding part 29' at the first inclination angle θ1, and a second inclined face-corresponding portion 30b' that is inclined radially inward and rearward from the radially inner end of the first inclined face-corresponding portion 30a' at the second inclination angle θ2 (see FIG. 19).

As described above, the sectional shape of the metal element material 23' substantially coincides with the sectional shape of the metal element 23 except for the point that it does not have portions corresponding to the projecting part 32 and the recess part 33 of the metal element 23 and the point that it does not have portions corresponding to the recess portion 30c and the projecting portion 30d of the metal element 23.

Figure 17:
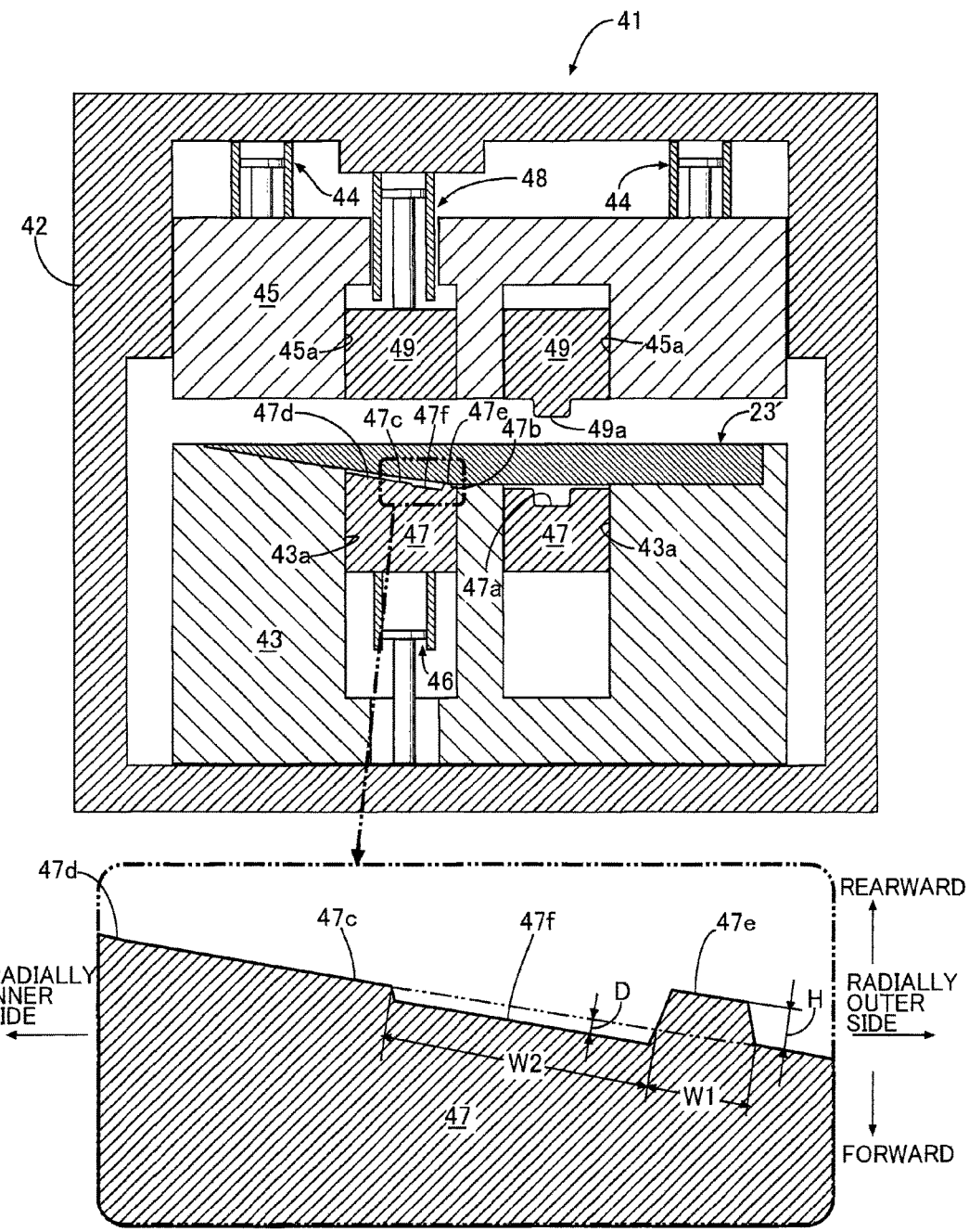
FIG. 17 is a sectional view of a punching machine and the metal element material (second embodiment).

As shown in FIG. 17, a punching machine 41 for punching out the metal element 23 from the metal element material 23' includes a lower die 43 that is fixed to a lower part of a frame body 42, an upper die 45 that is supported on an upper part of the frame body 42 so that it can freely ascend and descend and that is driven up and down by a die drive cylinder 44, a counterpunch 47 that is fitted into an upper face-opening recess portion 43a formed in the lower die 43 and driven up and down by means of a counterpunch drive cylinder 46, and a main punch 49 that is fitted into a lower face-opening recess portion 45a formed in the upper die 45 and driven up and down by means of a main punch drive cylinder 48.

In addition, in FIG. 17 the counterpunch 47 and the main punch 49 are illustrated so as to separately have a portion for molding the ear part 26 of the metal element 23 and a portion for molding the body part 24 of the metal element 23, but in reality the counterpunch 47 and the main punch 49 are both single members.

The outline shapes of the counterpunch 47 and the main punch 49 are the same as the outline shape of the metal element 23. Formed on the counterpunch 47 are a projecting part-molding portion 47a for molding the projecting part 32 of the metal element 23, a rocking edge-molding portion 47b for molding the rocking edge 29 of the metal element 23, a first inclined face-molding portion 47c for molding the first inclined face 30a of the metal element 23, and a second inclined face-molding portion 47d for molding the second inclined face 30b of the metal element 23, and formed on the main punch 49 is a recess part-molding portion 49a for molding the recess part 33 of the metal element 23.

Figure 19:
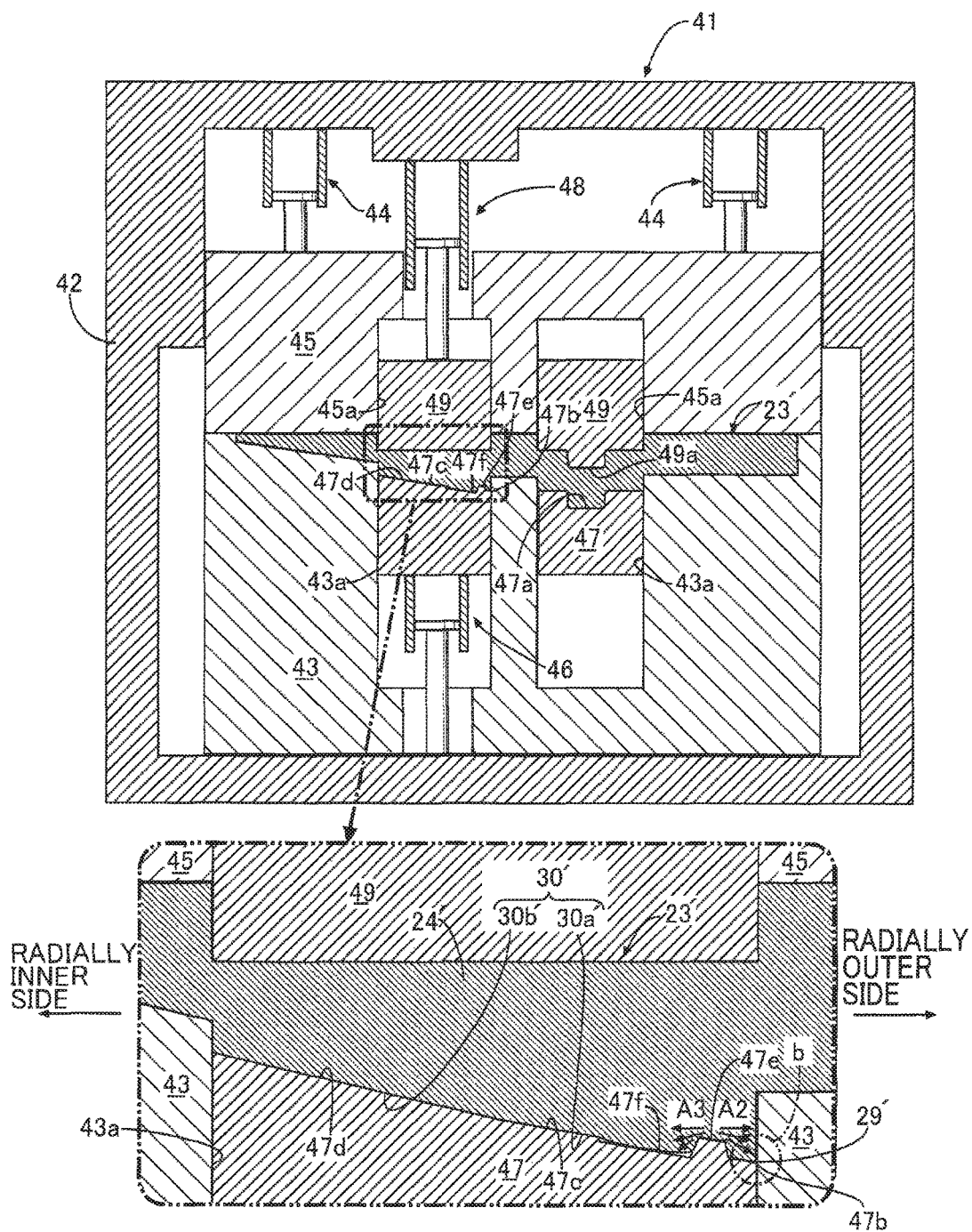
FIG. 19 is a diagram corresponding to FIG. 17 for explaining the operation (Part 2) (second embodiment).

As shown in FIG. 19, the first inclined face-molding portion 47c of the counterpunch 47 is parallel to the first inclined face-corresponding portion 30a' of the inclined face-corresponding part 30' of the metal element material 23', and the first inclined face-molding portion 47c and the first inclined face-corresponding portion 30a' are both inclined only at the first inclination angle θ1. The second inclined face-molding portion 47d of the counterpunch 47 is parallel to the second inclined face-corresponding portion 30b' of the inclined face-corresponding part 30' of the metal element material 23', and the second inclined face-molding portion 47d and the second inclined face-corresponding portion 30b' are both inclined only at the second inclination angle θ2.

Figure 21:
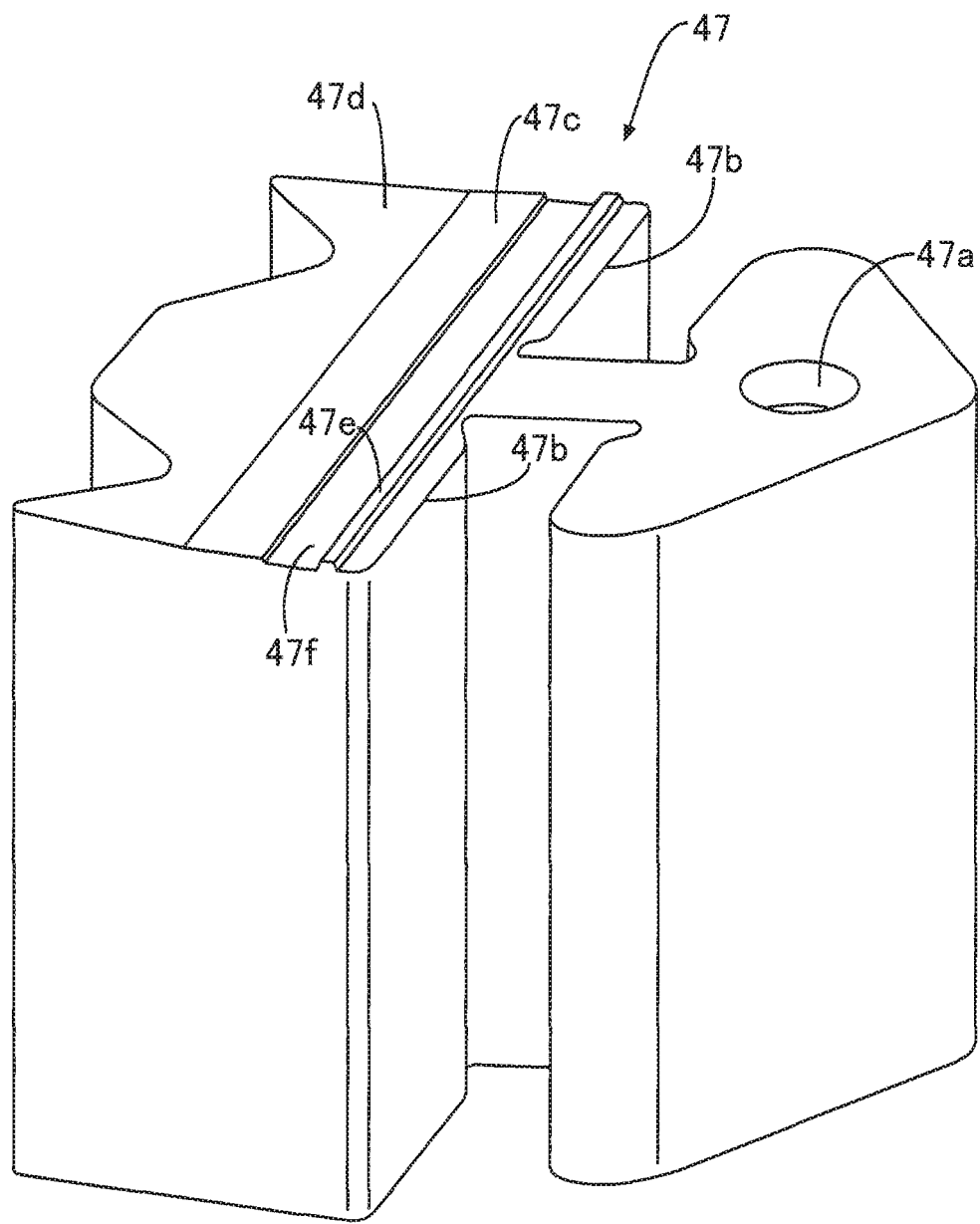
FIG. 21 is a perspective view of a counterpunch (second embodiment).

As shown in FIG. 19 and FIG. 21, formed on the first inclined face-molding portion 47c of the counterpunch 47 are a ridge-shaped projecting portion 47e extending in the left-and-right direction on the radially inner side of the rocking edge-molding portion 47b and a groove-shaped recess portion 47f extending in the left-and-right direction on the radially inner side of the projecting portion 47e. Furthermore, as shown in FIG. 17 in an enlarged manner, a fore-and-aft direction height H of the projecting portion 47e is set larger than a fore-and-aft direction depth D of the recess portion 47f, and a radial width W1 of the projecting portion 47e is set smaller than a radial width W2 of the recess portion 47f.

The operation of the second embodiment of the present invention having the above arrangement is now explained.

Figure 18:
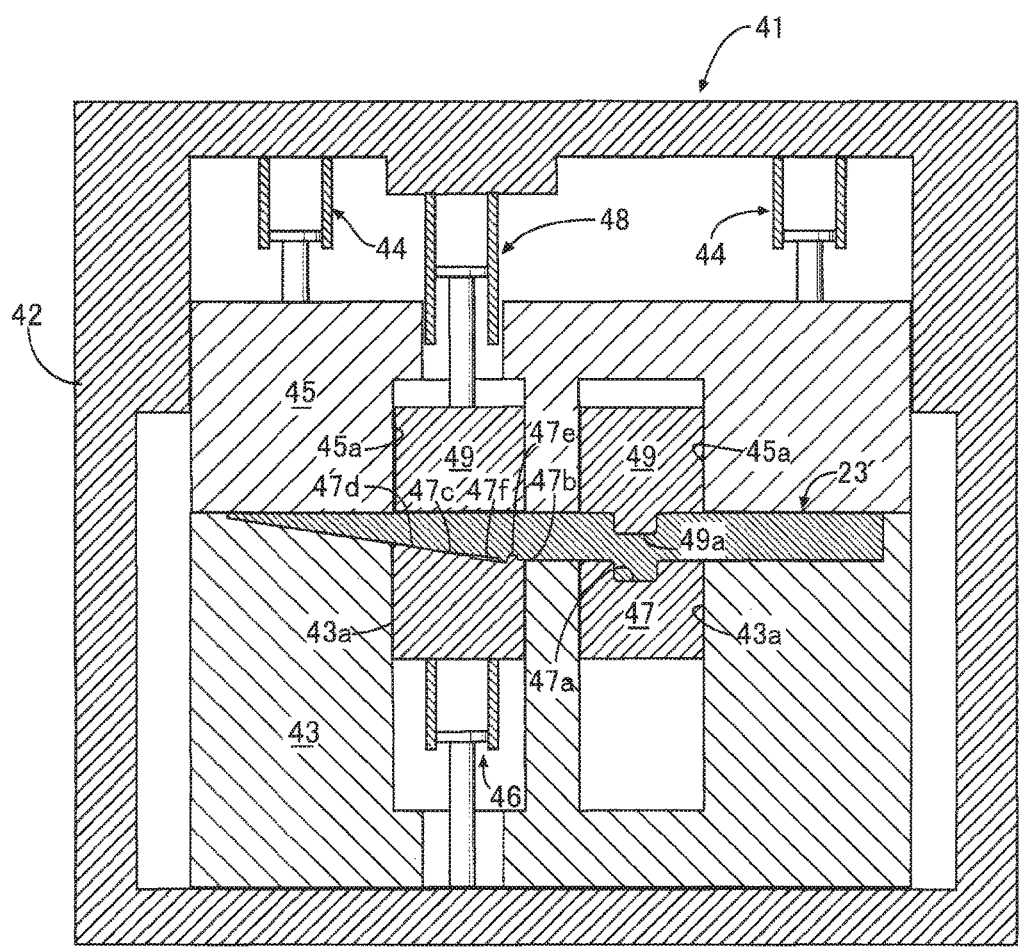
FIG. 18 is a diagram corresponding to FIG. 17 for explaining the operation (Part 1) (second embodiment).

As shown in FIG. 17, the metal element material 23', which is produced in advance, is placed on the lower die 43 and the counterpunch 47 of the punching machine 41. Next, as shown in FIG. 18, the upper die 45 is made to descend by means of the die drive cylinder 44, the metal element material 23' is sandwiched between the lower die 43 and the upper die 45 so as to fix it, the main punch 49 is then made to descend by means of the main punch drive cylinder 48, and the metal element material 23' is sandwiched between the counterpunch 47 and the main punch 49 to thus carry out press forming. As a result, the projecting part 32 and the recess part 33 of the metal element 23 are molded by means of the projecting part-molding portion 47a of the counterpunch 47 and the recess part-molding portion 49a of the main punch 49, and the first and second inclined face-corresponding portions 30a' and 30b' of the metal element material 23' (that is, the first and second inclined faces 30a and 30b of the metal element 23) are molded by means of the first and second inclined face-molding portions 47c and 47d of the counterpunch 47.

Figure 20:
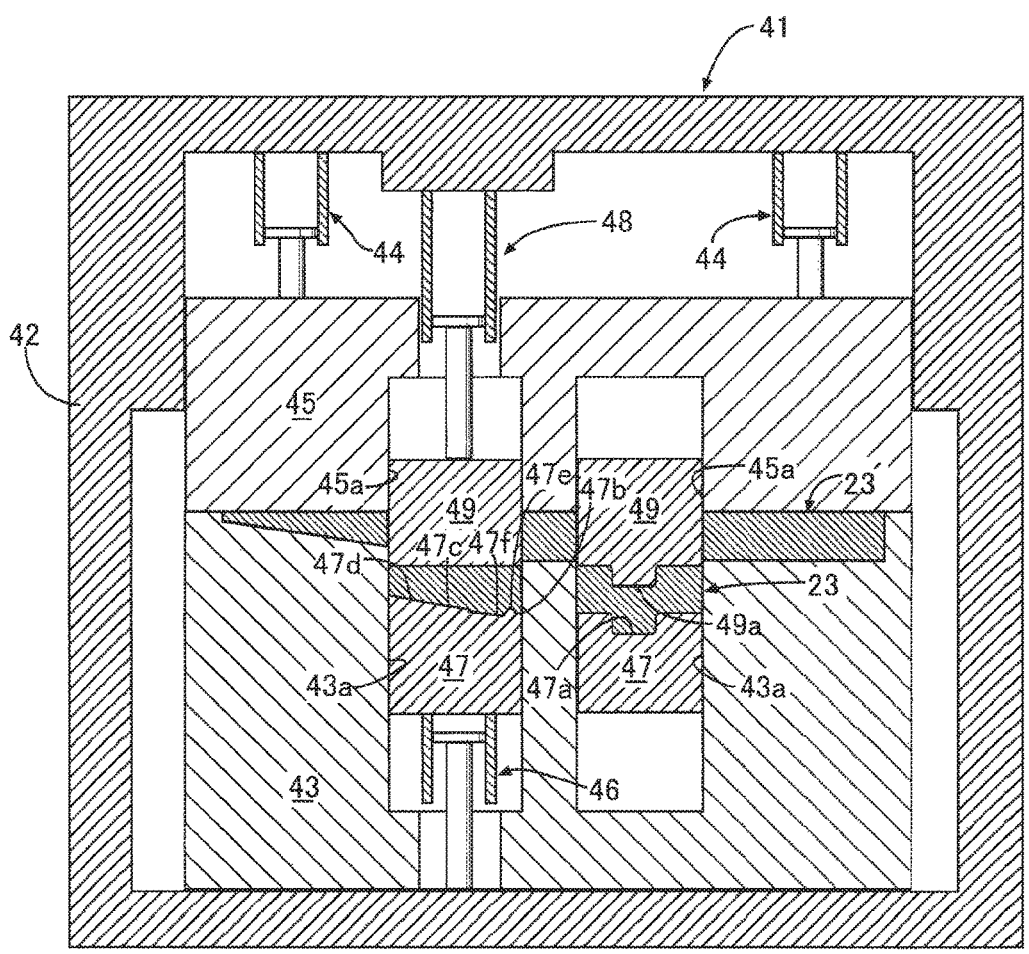
FIG. 20 is a diagram corresponding to FIG. 17 for explaining the operation (Part 3) (second embodiment).

When in this way press forming of the metal element 23 is completed, as shown in FIG. 19, the counterpunch 47 and the main punch 49 are made to descend by means of the counterpunch drive cylinder 46 and the main punch drive cylinder 48 with respect to the lower die 43 and the upper die 45, thus punching out the metal element 23 from the metal element material 23' as shown in FIG. 20.

Figure 22:
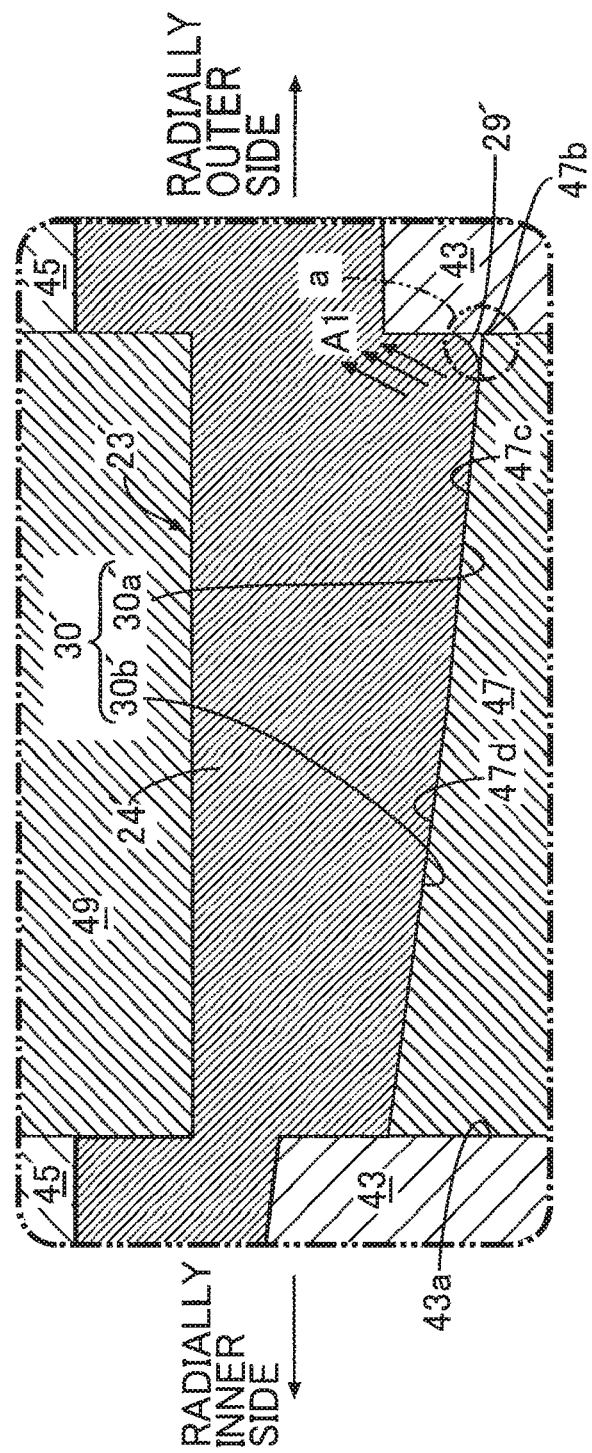
FIG. 22 is a diagram corresponding to an enlarged part of FIG. 20 for explaining the operation (Comparative Example).

In this process, as in a comparative example shown in FIG. 22, if the first inclined face-molding portion 47c of the counterpunch 47 does not include the projecting portion 47e of the second embodiment, at the time of punching out the metal element 23 the material of the body-corresponding part 24' sandwiched between the main punch 49 and the counterpunch 47 is stretched toward the adjacent lower die 43 and upper die 45 side as shown by an arrow A1, rollover (see a portion a of FIG. 22) occurs in the rocking edge-corresponding part 29' of the metal element material 23', and there is the problem that the rocking edge 29 of the completed metal element 23 is not molded in a sharp shape but becomes rounded.

However, in accordance with the second embodiment, as shown in FIG. 19, at the time of punching out the metal element 23, the material of the recess portion 30c compressed by the projecting portion 47e of the counterpunch 47 flows toward the radially outer side as shown by an arrow A2, and the material of the rocking edge-corresponding part 29' of the metal element material 23' is pressed against a side face of the lower die 43, thus enabling the rocking edge-corresponding part 29' (that is, the rocking edge 29 of the metal element 23) to be formed so that it is sharp (see a portion b of FIG. 19) without rollover occurring.

Furthermore, at the time of punching out the metal element 23, the material of the recess portion 30c compressed by the projecting portion 47e of the counterpunch 47 also flows toward the radially inner side as shown by an arrow A3, but since the recess portion 47f is formed on the radially inner side of the projecting portion 47e of the counterpunch 47, the material flowing toward the radially inner side is absorbed by the recess portion 47f, thus reducing the pressing load required for punching out the metal element 23 as well as enabling the durability of the punching machine 41 to be enhanced. In this process, since the volume (sectional area) of the recess portion 47f is set so that it sufficiently absorbs the material that is pushed out by the projecting portion 47e in the arrow A3 direction, it is possible for the recess portion 47f to reliably absorb the material pushed out by the projecting portion 47e, thus reducing the pressing load still more effectively.

Adjacent metal elements 23 swing relative to each other with the rocking edge 29 as a fulcrum when wound around the drive pulley 13 and the driven pulley 14; in a maximum gear ratio state the swing angle becomes a maximum in the drive pulley 13, for which the winding radius of the metal belt 15 becomes a minimum, and in a minimum gear ratio state it becomes a maximum in the driven pulley 14, for which the winding radius of the metal belt 15 becomes a minimum.

Since the metal element 23 of the second embodiment includes, on the inclined face 30a, the projecting portion 30d that has been molded by the recess portion 47f of the counterpunch 47, when adjacent metal elements 23 swing relative to each other, the projecting portion 30d of the metal element 23 positioned to the rear abuts against the rear face of the metal element 23 positioned in front, and there is a possibility that free swinging of the metal element 23 will be inhibited.

However, in accordance with the second embodiment, as shown in FIG. 15 in an enlarged manner, an inclination angle $\theta 3$ formed between the radial direction and a tangent Tg drawn from the rocking edge 29 of the metal element 23 to the projecting portion 30d is larger than a maximum swing angle $\theta 4$ of the metal element 23 occurring in the minimum winding radius part of the pulley, and it is therefore possible to prevent the projecting portion 30d of the metal element 23 to the rear from abutting against the rear face of the metal element 23 in front even when adjacent metal elements 23 swing with the maximum swing angle $\theta 4$, thus enabling free swinging of the metal element 23.

Moreover, as shown in FIG. 17 in an enlarged manner, since the fore-and-aft direction height H of the projecting portion 47e is larger than the fore-and-aft direction depth D of the recess portion 47f, and the radial width W1 of the projecting portion 47e is smaller than the radial width W2 of the recess portion 47f, as shown in FIG. 19 in an enlarged manner, not only is it possible to form the rocking edge 29 of the metal element 23 into a sharp shape by making a sufficient amount of material flow toward the radially outer side by means of the projecting portion 47e, but it is also possible to absorb a sufficient amount of material with the recess portion 47f while ensuring a maximum inclination angle $\theta 3$ (see FIG. 15) by suppressing the height of the projecting portion 30d of the metal element 23 formed with material that is pushed out by means of the projecting portion 47e.

As described above, in accordance with the second embodiment, it is possible to prevent rollover from occurring on the rocking edge 29 of the metal element 23 with a simple structure in which the projecting portion 47e and the recess portion 47f are merely provided on the counterpunch 47 of the punching machine 41, thus enhancing not only the precision of processing but also the durability of the punching machine 41 by reducing the pressing load required.

First and second embodiments of the present invention are explained above, but the present invention may be modified in a variety of ways as long as the modifications do not depart from the gist of the present invention.

For example, the neck part-corresponding part 25' of the metal element material 23' of the first and second embodiments forms a groove-shaped recess part, but this groove-shaped recess part is not always required.

What is claimed is:

1. A method for producing a metal element for a continuously variable transmission, comprising:
    press forming and punching out a band-shaped metal element material having a constant section using a mold,
    wherein the metal element comprises
        a pair of ring slots into which a pair of metal rings are fitted,
        a neck part that is positioned between the pair of ring slots, an ear part that is connected to a radially outer side of the neck part, and a body part that has formed thereon a saddle face connected to a radially inner side of the neck part and supporting an inner peripheral face of the metal ring, wherein a front face of the body part of the metal element has formed thereon a rocking edge extending in a left-and-right direction so as to overlap a front edge of the saddle face and an inclined face extending from the rocking edge radially inward and rearward, wherein an inclined face-corresponding part of the metal element material that corresponds to the inclined face of the metal element comprises a first inclined face-corresponding portion that is inclined rearward at a first inclination angle from a rocking edge-corresponding part that corresponds to the rocking edge of the metal element, and a second inclined face-corresponding portion that is inclined rearward at a second inclination angle that is larger than the first inclination angle from a radially inner end of the first inclined face-corresponding portion, wherein the mold comprises a first inclined face-molding portion that is inclined rearward at the first inclination angle from a rocking edge-molding portion that abuts against the rocking edge-corresponding part, and wherein at a time of press forming, the first inclined face-molding portion abuts against the first inclined face-corresponding portion of the metal element material to form a gap between the first inclined face-molding portion and the second inclined face-corresponding portion.

2. The method for producing a metal element for a continuously variable transmission according to claim 1, wherein a recess part that is recessed toward a rear is formed at a position, corresponding to the ring slot and the neck part of the metal element, of a front face of the metal element material.

3. The method for producing a metal element for a continuously variable transmission according to claim 1, wherein the mold comprises a projecting portion that is formed at a position corresponding to a radially inner side of the rocking edge of the metal element and a recess portion that is formed on a radially inner side of the projecting portion.

4. A metal element for a continuously variable transmission produced by the method according to claim 3, wherein the inclined face of the metal element comprises a projecting portion that is formed by means of a recess portion of the mold, and an inclination angle formed between a radial direction and a tangent drawn from the rocking edge to the projecting portion of the inclined face is larger than a maximum swing angle around the rocking edge of the metal element.

* * * * *